(12) United States Patent
Takizawa

(10) Patent No.: US 12,099,075 B2
(45) Date of Patent: *Sep. 24, 2024

(54) PHYSICAL QUANTITY SENSOR, COMPOSITE SENSOR, INERTIAL MEASUREMENT UNIT, PORTABLE ELECTRONIC APPARATUS, ELECTRONIC APPARATUS, AND VEHICLE

(71) Applicant: SEIKO EPSON CORPORATION, Tokyo (JP)

(72) Inventor: Teruo Takizawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,184

(22) Filed: Apr. 5, 2023

(65) Prior Publication Data

US 2023/0243864 A1 Aug. 3, 2023

Related U.S. Application Data

(63) Continuation of application No. 17/377,525, filed on Jul. 16, 2021, now Pat. No. 11,754,594, which is a
(Continued)

(30) Foreign Application Priority Data

Dec. 19, 2017 (JP) .................................. 2017-242453

(51) Int. Cl.
*G01P 15/14* (2013.01)
*G01C 19/5733* (2012.01)
(Continued)

(52) U.S. Cl.
CPC .......... *G01P 15/14* (2013.01); *G01C 19/5733* (2013.01); *G01C 19/5747* (2013.01);
(Continued)

(58) Field of Classification Search
CPC ...... G01P 15/14; G01P 15/0802; G01P 15/08; G01C 19/5783; G01C 19/5733; G01C 19/5747; G01C 19/5712
See application file for complete search history.

(56) References Cited

U.S. PATENT DOCUMENTS 5,501,893 A 3/1996 Laermer et al.
5,542,295 A * 8/1996 Howe .................. G01P 15/0802
73/DIG. 1
(Continued)

FOREIGN PATENT DOCUMENTS

JP H07-503815 A 4/1995
JP 2003-149568 A 5/2003
(Continued)

*Primary Examiner* — Helen C Kwok
(74) *Attorney, Agent, or Firm* — Harness, Dickey & Pierce, P.L.C.

(57) ABSTRACT

A gyro sensor includes: a spring having an inner span beam connected to an outer span beam via a turnaround beam; and a fixed driver that laterally faces the outer beam. A first beam is provided to the structure side of the outer beam so as to face the outer beam. T1 is a width of a space between the outer beam and the structure, T2 is a width of a space between the inner and outer beams, and T2<T1.

12 Claims, 18 Drawing Sheets

Related U.S. Application Data continuation of application No. 16/224,033, filed on Dec. 18, 2018, now Pat. No. 11,092,617.

(51) Int. Cl.
  *G01C 19/5747* (2012.01)
  *G01C 19/5783* (2012.01)
  *G01P 15/08* (2006.01)
  *G01P 15/18* (2013.01)
  *G05D 1/00* (2024.01)

(52) U.S. Cl.
  CPC ...... *G01C 19/5783* (2013.01); *G01P 15/0802* (2013.01); *G01P 15/18* (2013.01); *G05D 1/027* (2013.01)

(56) References Cited

U.S. PATENT DOCUMENTS

| | | | |
|---|---|---|---|
| 6,105,428 A * | 8/2000 | Schmiesing | G01P 15/125 73/514.32 |
| 6,272,926 B1 | 8/2001 | Fehrenbach | |
| 6,494,096 B2 | 12/2002 | Sakai et al. | |
| 6,740,537 B2 * | 5/2004 | Helin | G02B 26/0841 359/223.1 |
| 7,000,473 B2 | 2/2006 | Vandemeer et al. | |
| 7,004,025 B2 | 2/2006 | Tamura | |
| 7,013,730 B2 | 3/2006 | Malametz | |
| 7,111,513 B2 | 9/2006 | Sugiura | |
| 7,243,545 B2 | 7/2007 | Sakai et al. | |
| 7,637,160 B2 * | 12/2009 | Koury, Jr. | G01P 15/135 73/514.32 |
| 9,435,823 B2 | 9/2016 | Naruse | |
| 9,718,670 B2 | 8/2017 | Tanaka | |
| 10,712,359 B2 | 7/2020 | McNeil | |
| 11,092,617 B2 * | 8/2021 | Takizawa | G01P 15/14 |
| 11,754,594 B2 * | 9/2023 | Takizawa | G01C 19/5733 73/504.03 |
| 2002/0104377 A1 | 8/2002 | Ishio | |
| 2002/0112538 A1 | 8/2002 | Pinter et al. | |
| 2003/0027370 A1 | 2/2003 | Helin | |
| 2008/0000297 A1 * | 1/2008 | Koury | G01P 15/135 73/514.32 |
| 2015/0247877 A1 * | 9/2015 | Kanemoto | G01C 19/5726 73/504.04 |
| 2018/0100874 A1 | 4/2018 | Zhang | |
| 2019/0187171 A1 | 6/2019 | Takizawa | |

FOREIGN PATENT DOCUMENTS

| | | |
|---|---|---|
| JP | 2009-175079 A | 8/2009 |
| JP | 6787304 B2 | 11/2020 |

* cited by examiner

PHYSICAL QUANTITY SENSOR, COMPOSITE SENSOR, INERTIAL MEASUREMENT UNIT, PORTABLE ELECTRONIC APPARATUS, ELECTRONIC APPARATUS, AND VEHICLE

CROSS-REFERENCE TO RELATED APPLICATIONS

This application is a continuation of U.S. patent application Ser. No. 17/377,525 filed Jul. 16, 2021, which is a continuation of U.S. patent application Ser. No. 16/224,033 filed Dec. 18, 2018, now U.S. Pat. No. 11,092,617 issued Aug. 17, 2021, which claims priority to Japanese Patent Application No. 2017-242453, filed Dec. 19, 2017, all of which are hereby expressly incorporated by reference herein in their entireties.

BACKGROUND

1. Technical Field

The present invention relates to a physical quantity sensor, a composite sensor, an inertial measurement unit, a portable electronic apparatus, an electronic apparatus, and a vehicle.

2. Related Art

Recently, as an example of a physical quantity sensor, a gyro sensor which uses a gyro sensor element utilizing silicon MEMS (micro-electromechanical system) technology has been developed. Among physical quantity sensors, the gyro sensor, which detects an angular velocity, is quickly coming into widespread use, for example, for the motion sensing function of a game machine or the like.

As such a gyro sensor, for example, JP-A-2009-175079 discloses a sensor element that forms an angular velocity sensor. The sensor element has a support substrate, a fixed part fixed to the support substrate, a vibrator supported to the fixed part via an elastic beam (support beam), a movable comb-like electrode provided on the vibrator, and a fixed comb-like electrode meshing with the movable electrode with a space between them. In the angular velocity sensor of such a configuration, a voltage applied to the fixed comb-like electrode generates an electrostatic force between the movable electrode and the fixed comb-like electrode and this electrostatic force causes the vibrator to vibrate in the direction of an X-axis (drive detection). An angular velocity about a Z-axis (or Y-axis) acting on the vibrator in such a vibrating state generates a Coriolis force and this Coriolis force causes the vibrator to vibrate in the direction of the Y-axis (or Z-axis) (detection vibration). Detecting an electrical signal corresponding to the magnitude of the vibration amplitude in the Y-axis (or Z-axis) direction of the vibrator due to the Coriolis force enables detection of the angular velocity of rotation.

Such a sensor element can be manufactured by dry etching. For example, JP-T-7-503815 discloses a so-called Bosch process, which is a Si deep reactive ion etching technique in which an etching step and a sidewall protection film deposition step are repeated, alternately switching between the two types of reactive plasma gases of $SF_6$ (etching gas) and $C_4F_8$ (deposition gas). The deep reactive ion etching is also referred to as deep etching.

However, when the sensor element described in JP-A-2009-175079 is to be manufactured by the dry etching technique described in JP-T-7-503815, if the shape pattern of each site of the sensor element is partly coarse and fine, the etching gas spreads unevenly, thus causing the cross-sectional shape of each site to vary. Specifically, at a site (pattern) with a higher aperture ratio, side etching due to the spreading of the etching gas progresses further and increases the change in the cross-sectional shape. On the other hand, at a site (pattern) with a lower aperture ratio, the change in the cross sectional shape is smaller. If such variation in the cross sectional shape occurs in an elastic part that supports the vibrator, the resonant frequency at each site of the elastic part varies and affects a detection signal in the sensor element. This poses the problem of reduced detection accuracy.

SUMMARY

An advantage of some aspects of the invention is to solve at least a part of the problems described above, and the invention can be implemented as the following forms or application examples.

Application Example 1

A physical quantity sensor according to this application example includes: an elastic part having a plurality of beams connected via a turnaround part; and a structure that faces an outer beam situated on the outer side, of the plurality of beams. A first beam that faces the outer beam is provided to the structure side of the outer beam, if T2<T1 holds, where T1 is a space between the outer beam and the structure and T2 is a space between the plurality of beams.

In the physical quantity sensor according to this application example, the first beam facing the outer beam is provided to the structure side of the outer beam, if the space T1 between the outer beam and the structure and the space T2 between the plurality of beams have the relation of T2<T1, that is, if the aperture ratio between the outer beam and the structure is high. The first beam can reduce the aperture ratio between the outer beam and the structure nearly to the aperture ratio between the beams. This can reduce the variation in the cross-sectional shape due to the spreading of the etching gas and can therefore reduce the reduction in the detection accuracy due to the variation in the resonant frequency of the elastic part including the plurality of beams generated by the variation in the cross-sectional shape.

Application Example 2

In the physical quantity sensor according to the application example, it is preferable that 0.8<T3/T2<3.0 is satisfied, where T3 is a space between the outer beam and the first beam.

In this application example, the difference between the space (aperture ratio) between the first beam and the outer beam and the space (aperture ratio) between the plurality of beams can be reduced. In other words, the variation in the cross-sectional shape of the plurality of beams can be reduced to a level that affects the resonant frequency only slightly. Thus, the variation in the resonant frequency of the elastic part generated by the variation in the cross-sectional shape of the plurality of beams can be reduced.

Application Example 3

In the physical quantity sensor according to the application example, it is preferable that 0.8<T3/T2≤2.0 is satisfied.

In this application example, the difference between the space (aperture ratio) between the first beam and the outer beam and the space (aperture ratio) between the plurality of beams can be reduced further to a level that hardly affects the resonant frequency. Thus, the variation in the resonant frequency of the beams generated by the variation in the cross-sectional shape of the plurality of beams can be reduced further.

Application Example 4

In the physical quantity sensor according to the application example, it is preferable that $0.9 \leq T3/T2 \leq 1.1$ is satisfied.

In this application example, the difference between the space (aperture ratio) between the first beam and the outer beam and the space (aperture ratio) between the plurality of beams can be reduced further to a level that does not affect the resonant frequency. Thus, the variation in the resonant frequency of the beams generated by the variation in the cross-sectional shape of the plurality of beams can be reduced significantly.

Application Example 5

In the physical quantity sensor according to the application example, it is preferable that T110 μm is satisfied.

In this application example, setting the space between the outer beam and the structure in this manner can make the physical quantity sensor smaller.

Application Example 6

In the physical quantity sensor according to the application example, it is preferable that $20 \ \mu m \leq D1 \leq 30 \ \mu m$ is satisfied, where D1 is a depth of the beams.

In this application example, if the depth D1 of the beams satisfies $20 \ \mu m \leq D1 \leq 30 \ \mu m$, the variation in the cross-sectional shape due to the spreading of the etching gas can be reduced. Thus, the reduction in the detection accuracy due to the variation in the resonant frequency of the plurality of beams generated by the variation in the cross-sectional shape can be reduced.

Application Example 7

In the physical quantity sensor according to the application example, it is preferable that $0 < W1 \leq 10 \ \mu m$ is satisfied, where W1 is a width of the beams.

In this application example, if the depth D1 of the beams is $20 \ \mu m \leq D1 \leq 30 \ \mu m$, the aspect ratio (width/depth) of the beams is ½ or less. Thus, a physical quantity sensor can be provided which is small and which has improved detection accuracy by restraining the reduction in the detection accuracy due to the variation in the resonant frequency of the plurality of beams generated by the variation in the cross-sectional shape.

Application Example 8

In the physical quantity sensor according to the application example, it is preferable that the elastic part and the structure are provided in a sensor element, and that the sensor element is an angular velocity sensor element that can detect an angular velocity.

In this application example, the reduction in the detection accuracy due to the variation in the resonant frequency of the plurality of beams can be reduced. Thus, an angular velocity sensor with stable output characteristics can be provided.

Application Example 9

A composite sensor according to this application example includes: the physical quantity sensor according to Application Example 8; and an acceleration sensor.

In this application example, the composite sensor including the angular velocity sensor, in which the reduction in the detection accuracy due to the variation in the resonant frequency of the plurality of beams is reduced, and the acceleration sensor, can be easily formed. Thus, stable angular velocity data and acceleration data can be acquired.

Application Example 10

An inertial measurement unit according to this application example includes: the physical quantity sensor described in Application Example 8; an acceleration sensor; and a control unit (controller) which controls the physical quantity sensor and the acceleration sensor.

In the inertial measurement unit according to this application example, the control unit (controller) controls the physical quantity sensor (angular velocity sensor), in which the reduction in the detection accuracy due to the variation in the resonant frequency of the plurality of beams is reduced, and the acceleration sensor. Thus, an inertial measurement unit that can output highly reliable physical quantity data can be provided.

Application Example 11

A portable electronic apparatus according to this application example includes: the physical quantity sensor described in one of the application examples; a case which accommodates the physical quantity sensor; a processing unit (processor) which is accommodated in the case and processes output data from the physical quantity sensor; a display unit accommodated in the case; and a light-transmissive cover which closes an opening of the case.

In the portable electronic apparatus according to this application example, the processing unit (processor) performs control based on output data outputted from the physical quantity sensor. Thus, a highly reliable portable electronic apparatus that can achieve the effects of the physical quantity sensor can be provided.

Application Example 12

It is preferable that the portable electronic apparatus described in the application example includes a satellite positioning system and thus measures a moving distance or a trajectory of movement of a user.

This application example can provide a highly reliable portable electronic apparatus that can measure the moving distance or the trajectory of movement of the user via the satellite positioning system.

Application Example 13

An electronic apparatus according to this application example includes: the physical quantity sensor described in one of the application examples; and a control unit (controller) which performs control based on a detection signal outputted from the physical quantity sensor.

In the electronic apparatus according to this application example, the control unit (controller) performs control based on a detection signal outputted from the physical quantity sensor. Thus, a highly reliable electronic apparatus that can achieve the effects of the physical quantity sensor can be provided.

Application Example 14

A vehicle according to this application example includes: the physical quantity sensor described in one of the application examples; and an attitude control unit (attitude controller) which controls an attitude, based on a detection signal outputted from the physical quantity sensor.

In the vehicle according to this application example, the attitude control unit (attitude controller) controls the attitude, based on a detection signal outputted from the physical quantity sensor. Thus, a highly reliable vehicle that can achieve the effects of the physical quantity sensor can be provided.

Application Example 15

It is preferable that the vehicle described in the application example includes at least one system from among an engine system, a braking system, and a keyless entry system, and that the attitude control unit (attitude controller) controls the system, based on the detection signal.

In this application example, the attitude control unit (attitude controller) controls at least one system from among an engine system, a braking system, and a keyless entry system, based on a detection signal outputted from the physical quantity sensor. Thus, a highly reliable vehicle that can achieve the effects of the physical quantity sensor can be provided.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, a physical quantity sensor, a composite sensor, an inertial measurement unit, a portable electronic apparatus, an electronic apparatus, and a vehicle will be described in detail, based on embodiments illustrated in the accompanying drawings.

1. Physical Quantity Sensor

First Embodiment

Figure 1:
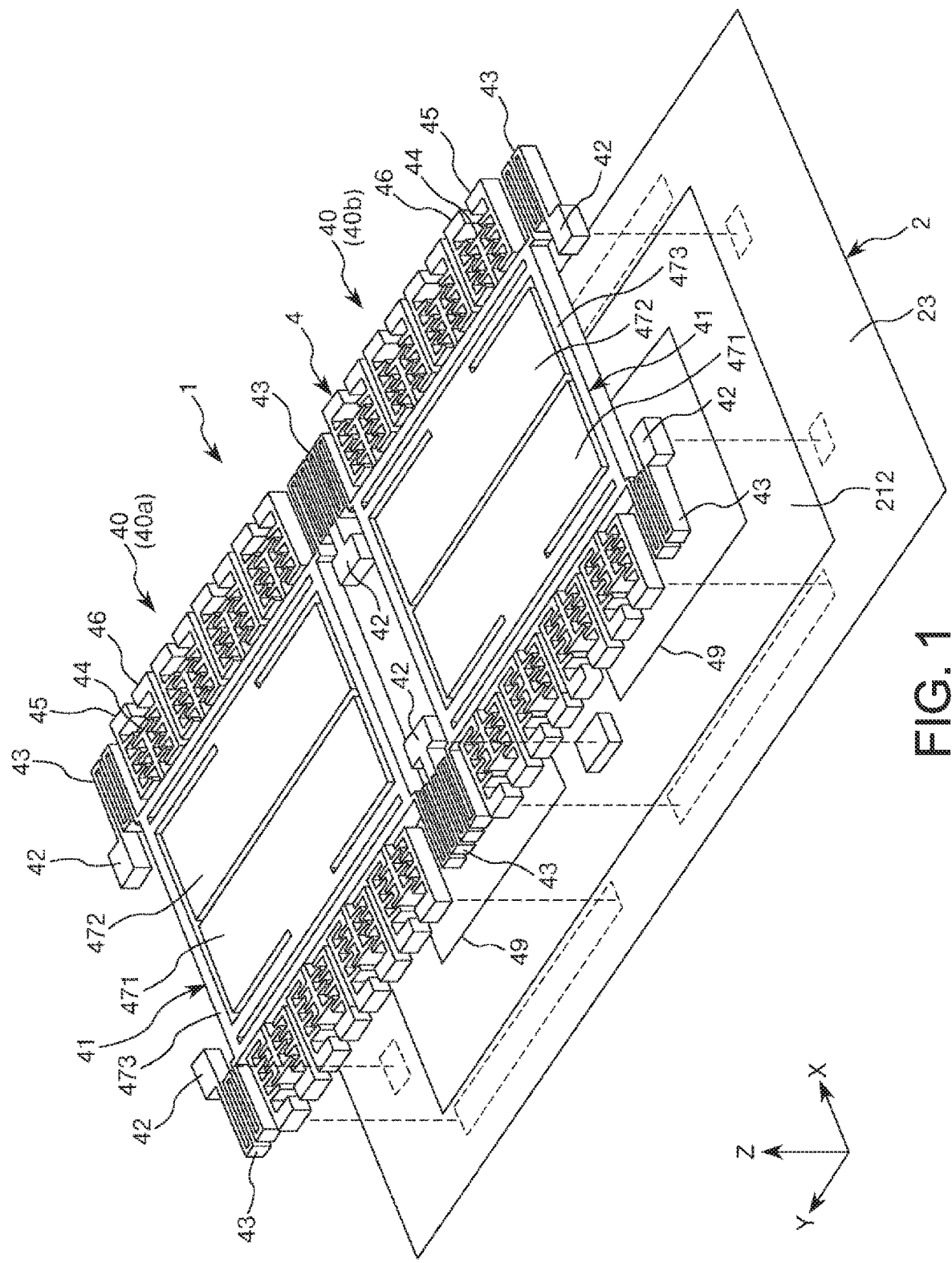
FIG. 1 is a perspective view showing a schematic configuration of a gyro sensor (angular velocity sensor) according to a first embodiment of a physical quantity sensor.
Figure 2:
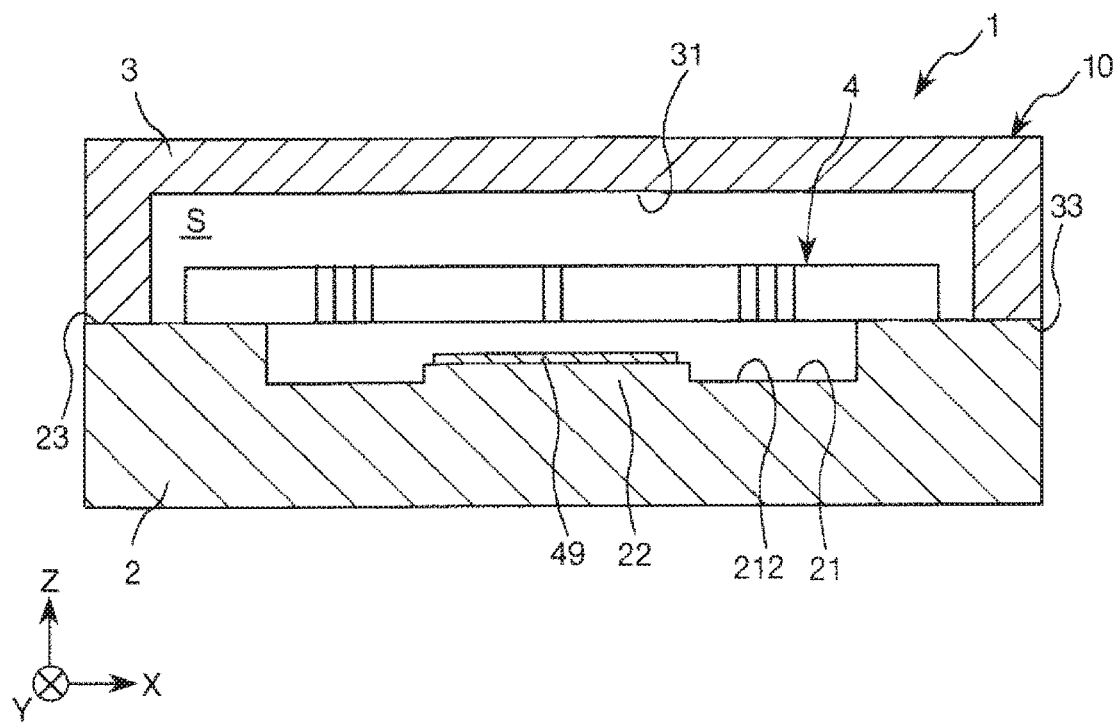
FIG. 2 is a cross-sectional view showing a schematic configuration of the gyro sensor shown in FIG. 1.
Figure 3:
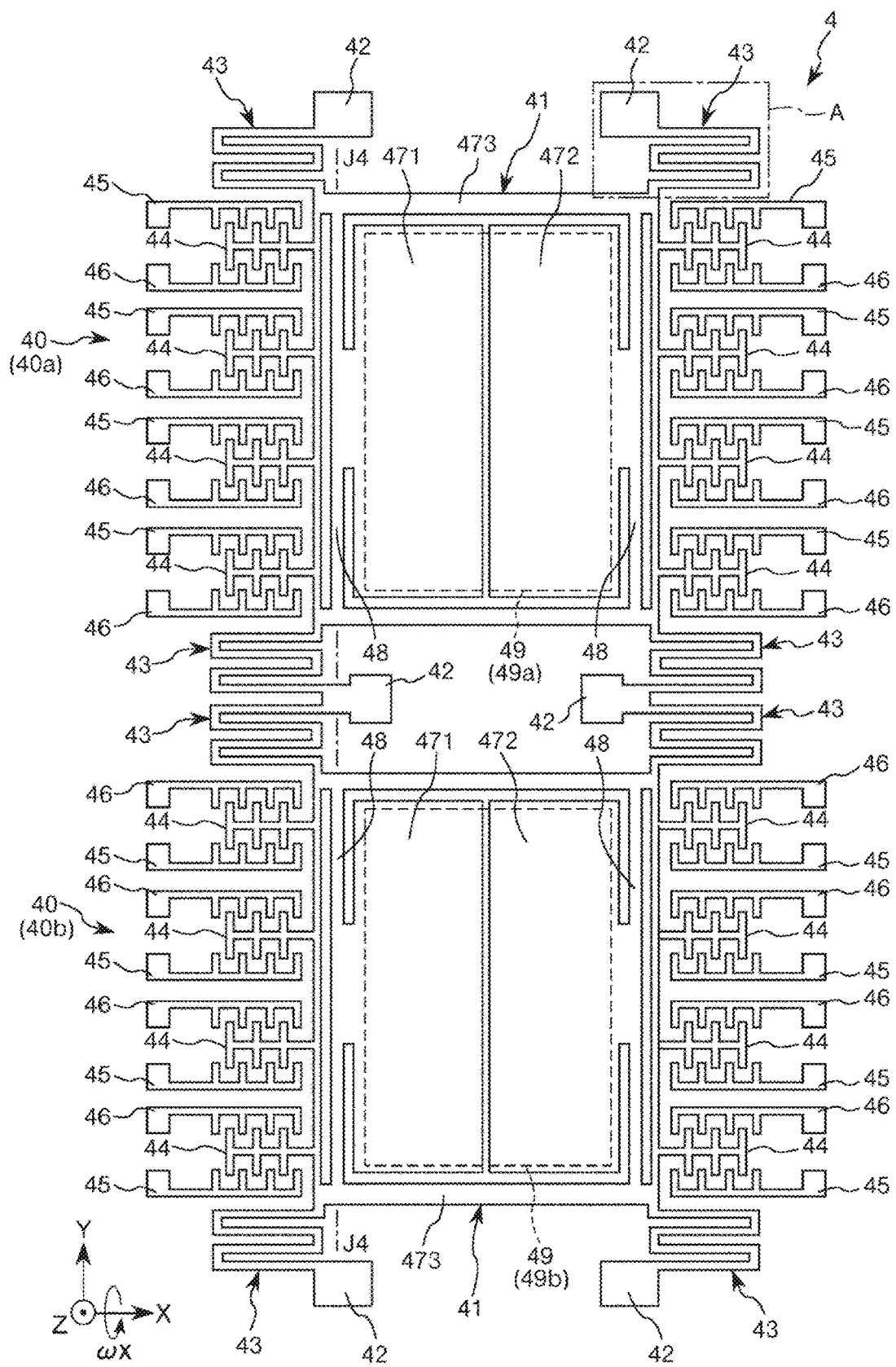
FIG. 3 is a plan view schematically showing a gyro sensor element shown in FIG. 1.

First, as an embodiment of the physical quantity sensor, a gyro sensor (angular velocity sensor) is described with reference to FIGS. 1, 2, and 3. FIG. 1 is a perspective view showing a schematic configuration of a gyro sensor (angular velocity sensor) according to a first embodiment of the physical quantity sensor. FIG. 2 is a cross-sectional view showing a schematic configuration of the gyro sensor shown in FIG. 1. FIG. 3 is a plan view schematically showing a gyro sensor element shown in FIG. 1. FIG. 1 schematically shows a substrate (base) and does not show a lid. In the following description of each embodiment of the physical quantity sensor below, an X-axis (third axis), a Y-axis (first axis), and a Z-axis (second axis) are provided as three axes orthogonal to each other. A direction along the X-axis is also referred to as "X-axis direction". A direction along the Y-axis is also referred to as "Y-axis direction". A direction along the Z-axis is also referred to as "Z-axis direction". The Z-axis is an axis indicating a direction of thickness in which the substrate and the lid come on top of each other. The Y-axis is an axis along the driving direction of the gyro sensor element. Also, for the sake of convenience of the description, when viewed in a plan view from the Z-axis direction, the +Z-axis direction side, which is the lid side, may be referred to as "up" and a surface on the +Z-axis direction side may be referred to as "upper surface". The −Z-axis direction side, which is opposite to the above, may be referred to as "down" and a surface on the −Z-axis direction side may be referred to as "lower surface". In the illustrations, for the sake of convenience of the description, the dimension of each part is exaggerated to a certain extent according to need. The dimension ratios between respective parts in the illustrations may not necessarily coincide with the actual dimension ratios of these parts.

Gyro Sensor

As shown in FIG. 1, a gyro sensor 1 according to the first embodiment of the physical quantity sensor is an angular velocity sensor that can detect an angular velocity about the X-axis. This gyro sensor 1 has a gyro sensor element (angular velocity sensor element) 4 as a sensor element, and a package 10 accommodating the gyro sensor element 4, as shown in FIG. 2.

Package

The package 10 has a substrate 2 (base) supporting the gyro sensor element 4, and a lid 3 bonded to the substrate 2. Between the substrate 2 and the lid 3, a space S accommodating the gyro sensor element 4 is formed. Each of the substrate 2 and the lid 3 is in the shape of a plate and arranged along an XY plane (reference plane), which is a plane including the X-axis and the Y-axis.

The substrate 2 is provided with a recess 21 opening upward (to the side of the gyro sensor element 4). At a center part of the recess 21, a protruding part 22 protruding from a bottom surface 212 of the recess 21 is provided. On an upper surface 23 excluding the recess 21 of the substrate 2, a part of the gyro sensor element 4 (fixed part 42 and fixed drive parts 45, 46, described later) is fixed.

The lid 3 is provided with a recess 31 opening downward (to the side of the substrate 2). The lid 3 is provided on the substrate 2 in such a way as to cover the gyro sensor element 4 in a contactless manner. A lower surface 33 of the lid 3 excluding the recess 31 is bonded to the upper surface 23 of the substrate 2.

The space S functioning as a cavity is an airtight space formed by the recess 21 and the recess 31 and is in a pressure-reduced state (for example, approximately $1\times10^2$ to $1\times10^{-2}$ Pa). Thus, the detection sensitivity for angular velocity can be improved.

Although the material forming the substrate 2 is not particularly limited, it is preferable to use an insulative material. Specifically, a high-resistance silicon material or glass material is preferable. For example, a glass material containing a predetermined amount of alkali metal ions (mobile ions) (for example, borosilicate glass such as Pyrex (trademark registered) glass) is preferable. Thus, if the gyro sensor element 4 is mainly made of silicon, the substrate 2 and the gyro sensor element 4 can be anodically bonded together. Also, a quartz substrate, quartz crystal substrate, or SOI (silicon-on-insulator) substrate may be employed.

The material forming the lid 3 is not particularly limited. For example, a material similar to that of the substrate 2 can be used.

The method for bonding the substrate 2 and the lid 3 is not particularly limited and may vary depending on the materials forming the substrate 2 and the lid 3. As the method for bonding the substrate 2 and the lid 3, for example, a bonding method using a bonding material such as an adhesive or brazing material, a direct bonding method, or a solid bonding method such as anodic bonding can be used.

Gyro Sensor Element

As shown in FIG. 3, the gyro sensor element (angular velocity sensor element) 4 as a sensor element has two element bodies 40 (40a, 40b) arranged next to each other in the Y-axis direction, and two fixed detection units (fixed detectors) 49 (49a, 49b). The two element bodies 40a, 40b have vertical symmetry in the +(positive) Y-axis direction and the −(negative) Y-axis direction in FIG. 3 and have similar configurations.

Each of the element bodies 40a, 40b has a mass part 41 (mass), a plurality of fixed parts 42 (fixed anchors), a plurality of elastic parts 43 (elastic arms, flexures, or springs) (serpentine flexure support springs), a plurality of drive parts 44 (drivers or movable drive electrodes), a plurality of fixed drive parts 45, 46 (fixed drivers or fixed drive electrodes), detection parts 471, 472 (detectors or movable detection electrodes), and a plurality of support beams 48. The mass part 41 includes the drive parts 44, a frame 473, the detection parts (detectors) 471, 472, and the support beams 48, which are integrally formed. That is, the detection parts (detectors) 471, 472 have a shape that is included in the mass part 41.

The outer shape of the mass part 41 is a quadrilateral frame-like shape, when viewed in a plan view seen from the Z-axis direction (hereinafter simply referred to as "when viewed in a plan view"), and includes the drive parts 44, the frame 473, and the detection parts (detectors) 471, 472, as described above. Specifically, the outer shape of the mass part 41 is formed by a pair of parts extending in the Y-axis direction and parallel to each other, and a pair of parts connecting end parts of the former pair of parts and extending in the X-axis direction and parallel to each other.

As the fixed parts 42, four fixed parts 42 are provided for one element body 40. Each fixed part 42 is fixed to the upper surface 23 of the substrate 2. Each fixed part 42 is arranged on the outside of the mass part 41, when viewed in a plan view. In this embodiment, each fixed part 42 is arranged at a position corresponding to each corner of the mass part 41. In the illustration, the fixed part 42 situated on the −Y-axis side in the element body 40a and the fixed part 42 situated on the +Y-axis side in the element body 40b are the same fixed part.

As the elastic parts 43, four elastic parts 43 are provided for one element body 40 in this embodiment. The respective elastic parts 43 connect a part of the mass part 41 to the fixed parts 42, when viewed in a plan view. In this embodiment, the elastic parts 43 are connected to the corners of the frame 473 of the mass part 41. However, this is not limiting. The elastic parts 43 may be connected to any positions where the elastic parts 43 can displace the mass part 41 with respect to the fixed parts 42. In FIG. 3, the elastic parts 43 are configured to be able to displace the mass part 41 in the Y-axis direction. In the illustration, each elastic part 43 has a square wave-like shape, when viewed in a plan view, and has first parts 4301a, 4301b, 4301c, 4301d as a plurality of beams extending in the X-axis direction (span beams), and second parts 4302 forming turnaround parts 430 (connector beam or turnaround beam) and extending in the Y-axis direction (see FIG. 4). The shape of each elastic part 43 is not limited to the illustrated shape, provided that the elastic part 43 can be elastically deformed in a desired driving direction (in this embodiment, the Y-axis direction).

As the drive parts 44, eight drive parts 44 are provided for one element body 40. Each drive part 44 is connected to a part extending in the Y-axis direction of the mass part 41. Specifically, four drive parts 44 are situated on the +X side of the mass part 41 and the remaining four drive parts 44 are situated on the −X side of the mass part 41. Each drive part 44 has a comb-like shape having a trunk part extending in the X-axis direction from the mass part 41 and a plurality of branch parts extending in the Y-axis direction from the trunk part.

As the fixed drive parts 45, 46, eight fixed drive parts 45 and eight fixed drive parts 46 are provided for one element body 40. The fixed drive parts 45, 46 are fixed to the upper surface 23 of the substrate 2. Each of the fixed drive parts 45, 46 has a comb-like shape corresponding to the drive part 44 and provided on both sides of the drive part 44.

Each of the detection parts (detectors) 471, 472 is a plate-like member which is quadrilateral when viewed in a plan view. The detection parts (detectors) 471, 472 are arranged on the inner side of the mass part 41 and connected to the mass part 41 via the support beams 48. Each of the detection parts (detectors) 471, 472 can pivotally turn (be displaced) about a pivotal axis J4.

The fixed detection units (fixed detectors) 49 (fixed detection electrodes) are provided on the protruding part 22 situated inside the recess 21 of the substrate 2 (see FIG. 2). Each of the fixed detection units (fixed detectors) 49 is quadrilateral when viewed in a plan view and faces the detection parts (detectors) 471, 472. The fixed detection units (fixed detectors) 49 are spaced apart from the detection parts (detectors) 471, 472.

The mass part 41, the elastic parts 43, the drive parts 44, a part of the fixed drive parts 45, a part of the fixed drive parts 46, the detection parts (detectors) 471, 472, and the support beams 48 of the above configuration are provided above the recess 21 of the substrate 2 and spaced apart from the substrate 2.

The element body 40 as described above is formed altogether by patterning an electrically conductive silicon substrate doped with an impurity such as phosphorus or boron, for example, using the Bosch process, in which an etching process with a reactive plasma gas and a deposition process are combined.

As the material forming the fixed detection units (fixed detectors) 49, for example, aluminum, gold, platinum, ITO (indium tin oxide), ZnO (zinc oxide) or the like can be used.

Although not illustrated, the fixed parts 42, the fixed drive parts 45, the fixed drive parts 46, the fixed detection unit (fixed detector) 49a, and the fixed detection unit (fixed detector) 49b are electrically connected respectively to wirings and terminals, not illustrated. The wirings and terminals are provided, for example, on the substrate 2.

The configuration of the gyro sensor 1 has been briefly described. The gyro sensor 1 of such a configuration can detect an angular velocity ωx in the following manner.

First, a drive voltage applied between the drive parts 44 and the fixed drive parts 45, 46 provided in the gyro sensor 1 generates an electrostatic attraction force that periodically changes in intensity, between the fixed drive parts 45, 46 and the drive parts 44. Thus, each drive part 44 vibrates in the Y-axis direction, accompanying elastic deformation of each elastic part 43. At this time, the plurality of drive parts 44 provided in the element body 40a and the plurality of drive parts 44 provided in the element body 40b vibrate in the opposite phases to each other in the Y-axis direction (drive vibration).

An angular velocity ωx applied to the gyro sensor 1 in the state where the drive parts 44 are thus vibrating in the Y-axis direction causes a Coriolis force to act, displacing the detection parts (detectors) 471, 472 about the pivotal axis J4. At this time, the detection parts (detectors) 471, 472 provided in the element body 40a and the detection parts (detectors) 471, 472 provided in the element body 40b are displaced in the opposite directions to each other. For example, when each of the detection parts (detectors) 471, 472 provided in the element body 40a is displaced in the +Z-axis direction, each of the detection parts (detectors) 471, 472 provided in the element body 40b is displaced in the −Z-axis direction. Meanwhile, when each of the detection parts (detectors) 471, 472 provided in the element body 40a is displaced in the −Z-axis direction, each of the detection parts (detectors) 471, 472 provided in the element body 40b is displaced in the +Z-axis direction.

Such displacement (detection vibration) of the detection parts (detectors) 471, 472 changes the distance between the detection parts (detectors) 471, 472 and the fixed detection units (fixed detectors) 49. With this change of the distance, the electrostatic capacitance between the detection parts (detectors) 471, 472 and the fixed detection units (fixed detectors) 49 changes. Based on the amount of change of the electrostatic capacitance, the angular velocity ωx applied to the gyro sensor 1 can be detected.

As described above, when the drive parts 44 vibrate in the Y-axis direction (drive vibration), ideally, it is preferable that the drive parts 44 vibrate substantially parallel to the Y-axis direction from a non-driven state. However, due to a processing error or the like, the shape of the gyro sensor element 4 may not be an ideal shape. Particularly, with respect to the shape of the beams (first parts 4301a, 4301b, 4301c, 4301d) forming the elastic part 43, the width W1 of the beams (see FIG. 4) may vary or the cross-sectional shape of the beams may not be an ideal rectangular shape. Such variation in the width W1 of the beams (see FIG. 4) causes the resonant frequency of the elastic parts 43 to vary. Also, if the cross-sectional shape of the beams is not rectangular, the vibration of the drive parts 44 connected to the elastic parts 43 via the mass part 41 may include not only a vibration component in the Y-axis direction, which is the desired direction of drive vibration, but also a vibration component (unwanted vibration component) in the X-axis direction or the Z-axis direction, which is not the desired direction of drive vibration. That is, a so-called quadrature signal may increase.

In this embodiment, the configuration of the elastic parts 43 is to be able to reduce the variation in the resonant frequency of the elastic parts 43 and to reduce the increase in the quadrature signal. The elastic parts 43 will be described in detail below with reference to FIGS. 4, 5, 6A and 6B.

Elastic Parts

Figure 4:
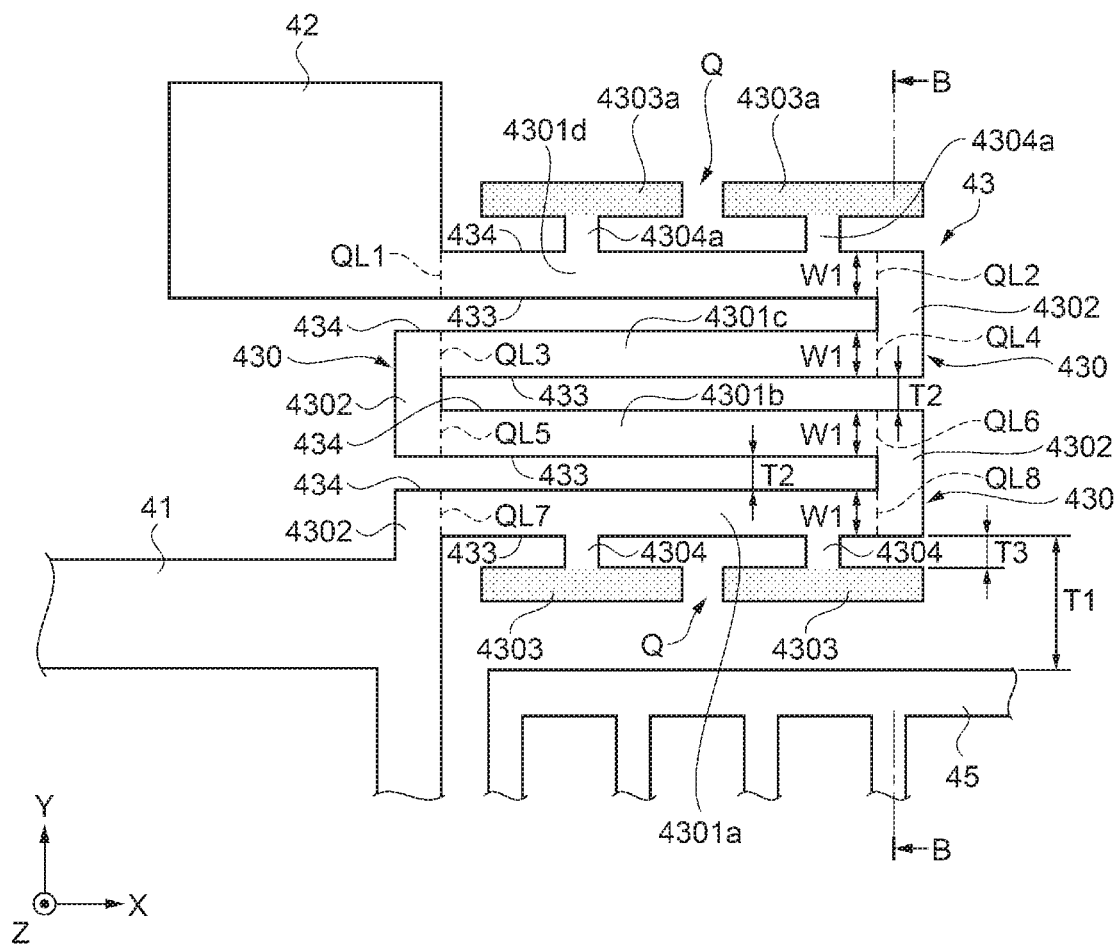
FIG. 4 is a plan view schematically showing a part (part A) of an elastic part shown in FIG. 3.
Figure 5:
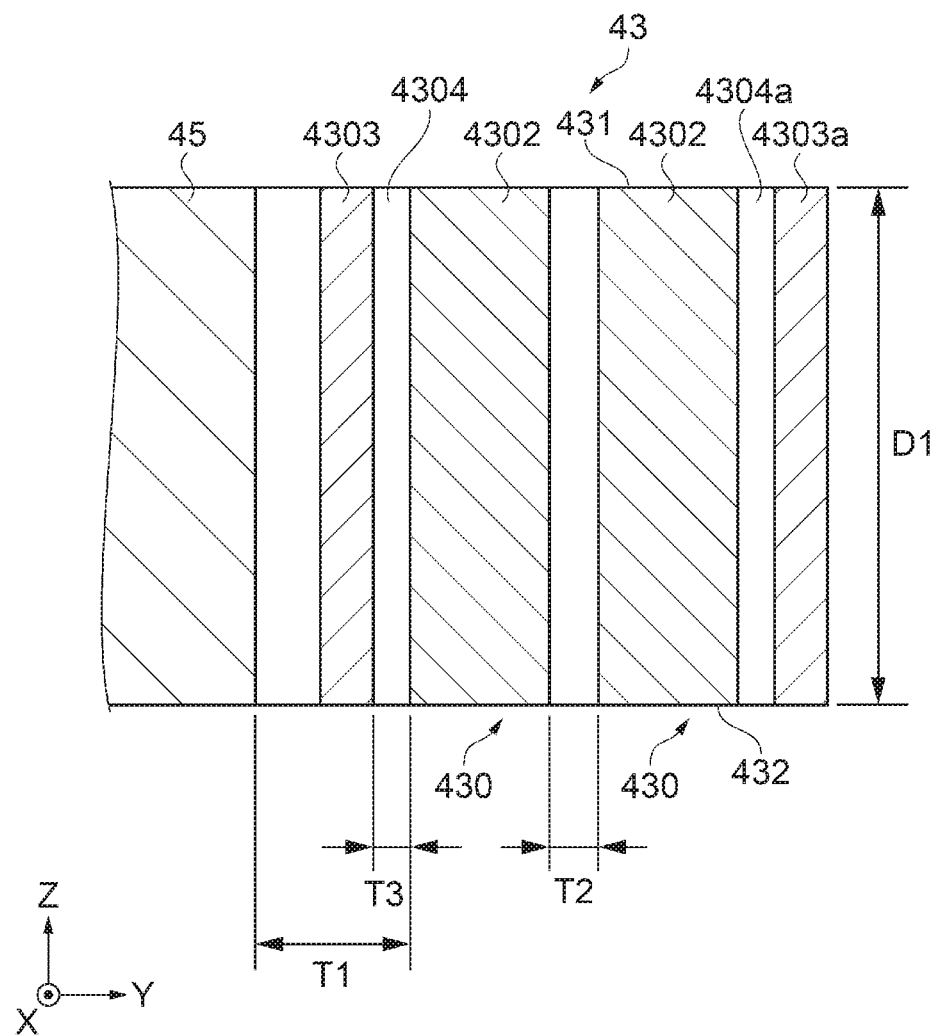
FIG. 5 is a cross-sectional view taken along B-B in FIG. 4.
Figure 6A:
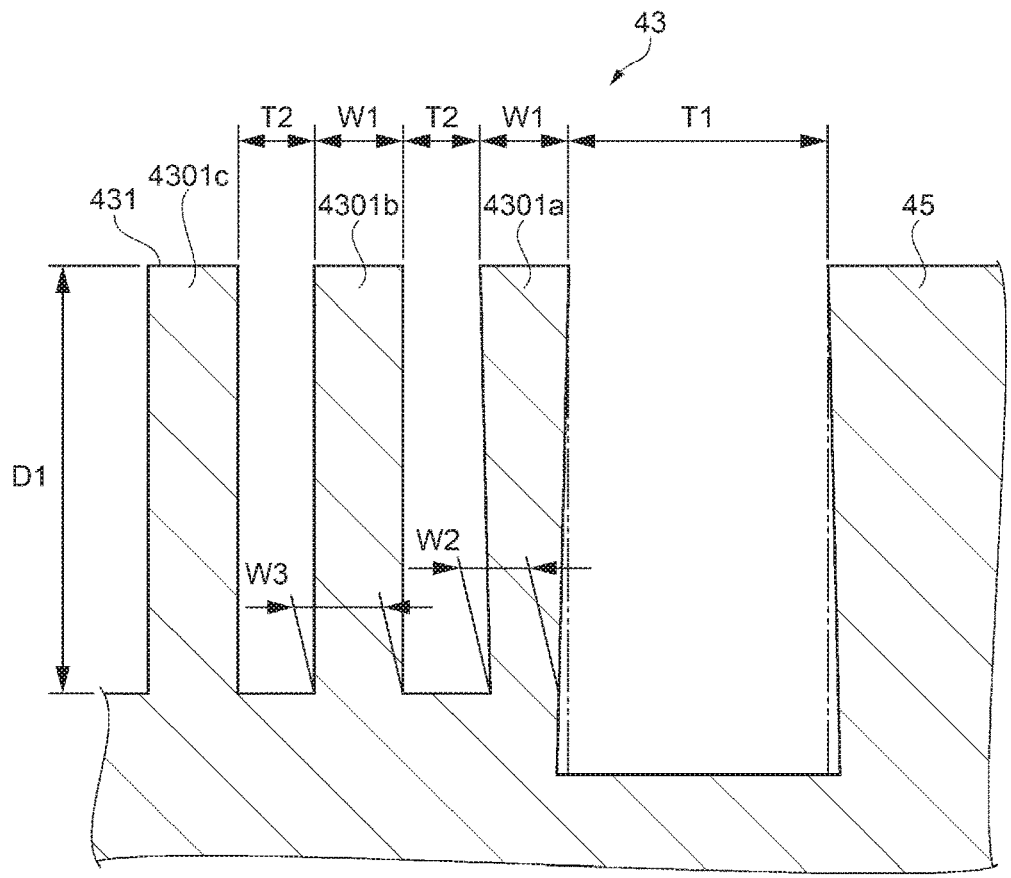
FIG. 6A is a cross-sectional view for explaining shape variation generated by a difference in aperture ratio in a dry etching method.
Figure 6B:
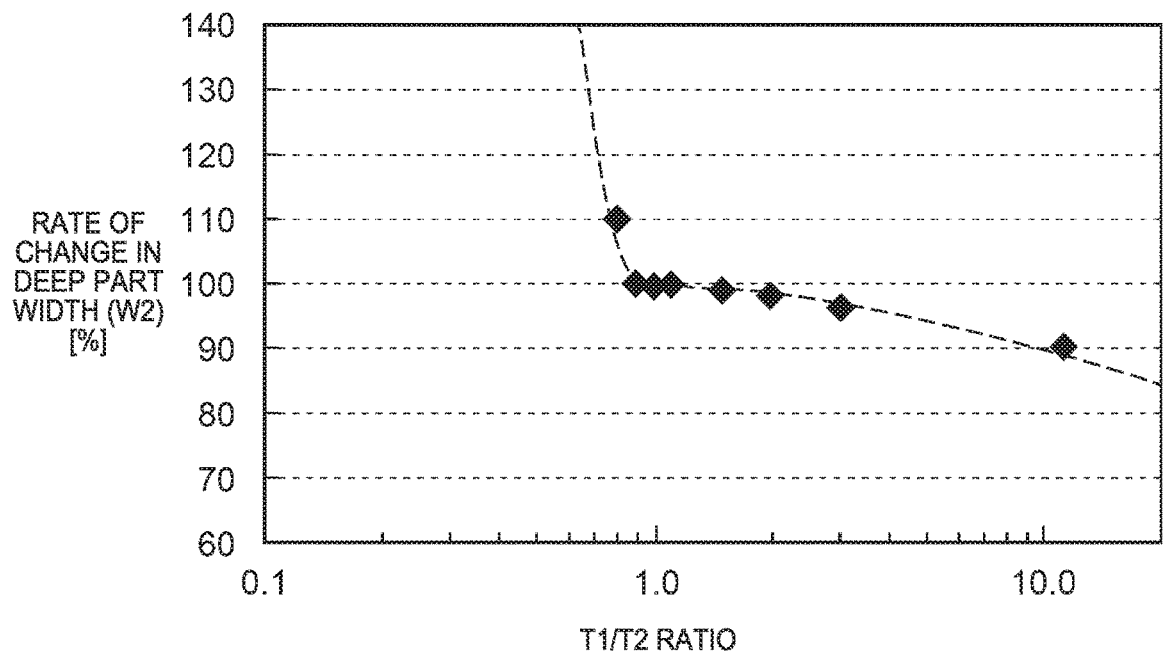
FIG. 6B is a graph showing a correlation between space T1/space T2 and the rate of change in width (deep part width) of beams.

FIG. 4 is a plan view schematically showing a part (part A) of the elastic parts shown in FIG. 3. In FIG. 4, the elastic part 43 in the part A surrounded by a dash-dotted line in FIG. 3 is illustrated as a representative example. FIG. 5 is a cross-sectional view schematically showing a part of the elastic part, taken along B-B in FIG. 4. FIG. 6A is a cross-sectional view for explaining shape variation generated by a difference in aperture ratio in a dry etching method. FIG. 6B is a graph showing a correlation between space T1/space T2 and the rate of change in width W1 (deep part width W2) of beams. The space T1 in FIG. 6B is the space between the beams and the structure. The space T2 is the space between one beam and the next beam.

As shown in FIG. 4, the elastic part 43 has a square wave-like shape, when viewed in a plan view, and has elongate first parts 4301a, 4301b, 4301c, 4301d as a plurality of beams extending along the X-axis direction (longitudinal direction), a plurality of second parts 4302 extending along the Y-axis direction (short-side direction), and a plurality of first beams 4303 connected to each of the two first parts 4301a, 4301d. The first parts 4301a, 4301b, 4301c, 4301d are longer than the second parts 4302. The first parts 4301a, 4301b, 4301c, 4301d are the parts marked off by dashed lines QL1, QL2, QL3, QL4, QL5, QL6, QL7, QL8 shown in the illustration, as approximate boundaries. The second parts 4302 form so-called turnaround parts 430, which connect the neighboring first parts 4301a, 4301b, 4301c, 4301d to form turnarounds. The plurality of first parts

4301*a*, 4301*b*, 4301*c*, 4301*d* are turned around at the turnaround parts 430 including the second parts 4302 and thus have a square wave-like shape. The elastic part 43 has its one end connected to an end part of the mass part 41 indicated by the dashed line QL7 in the illustration and has its other end connected to an end part of the fixed part 42 indicated by the dashed line QL1 in the illustration.

The elastic part 43 in this embodiment has the four first parts 4301*a*, 4301*b*, 4301*c*, 4301*d*. The four first parts 4301*a*, 4301*b*, 4301*c*, 4301*d* are arranged parallel to each other with the space T2 between them. The first parts 4301*a*, 4301*b*, 4301*c*, 4301*d* can be divided into the first part 4301*a* and the first part 4301*d* as two outer beams arranged on the outer side and the first part 4301*b* and the first part 4301*c* as two inner beams situated between the first part 4301*a* and the first part 4301*d* as the outer beams. The first parts 4301*a*, 4301*b*, 4301*c*, 4301*d* are turned around at the turnaround parts 430 including the second parts 4302 and thus form a square wave-like shape. The elastic part 43 has its one end connected to the mass part 41 and has its other end connected to the fixed part 42.

The first part 4301*a* as one outer beam has its one end connected to the mass part 41 and is arranged facing the fixed drive part 45 as the structure. The first part 4301*a* has the space T1 from the fixed drive part 45 and extends along the outer edge of the fixed drive part 45. The first part 4301*d* as the other outer beam has its one end connected to the fixed part 42 and is arranged on the side opposite to the fixed drive part 45.

The first part 4301*b* as one inner beam has its one end connected to the first part 4301*a* via a second part 4302 and has its other end connected to the first part 4301*c* via another second part 4302. The first part 4301*c* as the other inner beam, connected to the first part 4301*b* via the second part 4302 at the other end, is connected to the first part 4301*d* via another second part 4302 at its one end.

It is preferable that the four first parts 4301*a*, 4301*b*, 4301*c*, 4301*d* are formed in such a way as to have a width W1 (average width) in the direction (Y-axis direction) orthogonal to the longitudinal direction (X-axis direction) that satisfies $0 < W1 \leq 10$ (μm). In the first parts 4301*a*, 4301*b*, 4301*c*, 4301*d* thus configured, if a depth D1 (average depth) (see FIG. 6A) is $20 \, \mu m \leq D1 \leq 30 \, \mu m$, the aspect ratio (width/depth) of the first parts 4301*a*, 4301*b*, 4301*c*, 4301*d* is ½ or less. Thus, the gyro sensor 1 can be made small and its detection accuracy can be improved by restraining the reduction in the detection accuracy due to the variation in the resonant frequency of the plurality of first parts 4301*a*, 4301*b*, 4301*c*, 4301*d* generated by the variation in the cross-sectional shape.

The second parts 4302 are provided, extending along the Y-axis direction (short-side direction) intersecting the X-axis direction, which is the longitudinal direction of the first parts 4301*a*, 4301*b*, 4301*c*, 4301*d*. One second part 4302 forms a so-called turnaround part 430 which connects the first part 4301*a* and the next first part 4301*b* and thus forms a turnaround at the end on the +X-axis side. Similarly, the other second parts 4302 form a turnaround part 430 which connects the first part 4301*b* and the next first part 4301*c* and thus forms a turnaround at the end on the −X-axis side and a turnaround part 430 which connects the first part 4301*c* and the next first part 4301*d* and thus forms a turnaround at the end on the +X-axis side.

The first beams 4303 are arranged between the first part 4301*a* and the fixed drive part 45 as the structure. The first beams 4303 are connected to the first part 4301*a*, with a space T3 from the first part 4301*a* and via connecting parts 4304. In this embodiment, two first beams 4303 are provided. The two first beams 4303 have a gap Q at a position facing a center part in the longitudinal direction of the first part 4301*a* and extend along the longitudinal direction of the first part 4301*a*. The first beams 4303 are approximately the hatched parts in the illustration.

The first beams 4303 are provided particularly to reduce the variation in the cross-sectional shape of the first part 4301*a* at the time of dry etching such as the Bosch process used to form the gyro sensor element 4. The variation in the cross-sectional shape is due to the uneven spreading of the etching gas at the time of dry etching, generated by the coarseness and fineness of the shape pattern at each site of the gyro sensor element 4. The variation in the cross-sectional shape at each site generated by the coarseness and fineness of the shape pattern in the dry etching will be described below with reference to FIGS. 6A and 6B.

In the dry etching such as the Bosch process, at a site with a higher aperture ratio, that is, at a site (pattern) with a greater space from the neighboring site, the etching gas tends to spread easily and side etching due to the spreading of the etching gas progresses, thus increasing the change in the cross-sectional shape. On the other hand, at a site with a lower aperture ratio, that is, at a site with a narrower space from the neighboring site, the change in the cross-sectional shape is smaller (microloading effect).

Specifically, an example of processing a pattern simulating the elastic part 43 shown FIG. 6A will be described. FIG. 6A shows a cross section resulting from deep etching to a depth D1 of 20 μm to 30 μm ($20 \, \mu m \leq D1 \leq 30 \, \mu m$) by the Bosch process. As shown in FIG. 6A, the first part 4301*a* as the outer beam arranged with the space T1 from the fixed drive part 45 and the first part 4301*b* as the inner beam arranged with the space T2 from the first part 4301*a* are dry-etched by the Bosch process. In this example, the space T1 between the first part 4301*a* and the fixed drive part 45 and the space T2 between the first part 4301*a* and the first part 4301*b* satisfy the relation of T2<T1. That is, the space between the first part 4301*a* and the fixed drive part 45 is a pattern with a higher aperture ratio than the space between the first part 4301*a* and the first part 4301*b*. When dry etching is performed on such patterns, side etching tends to progress more quickly between the first part 4301*a* and the fixed drive part 45, where the aperture ratio is high (space T1), and side etching tends to progress less quickly between the first part 4301*a* and the first part 4301*b*, where the aperture ratio is low (space T2), as shown in FIG. 6A.

It is preferable that the space T1 between the first part 4301*a* and the fixed drive part 45 satisfies T1 10 (μm). Setting the space T1 between the first part 4301*a* as the outer beam and the fixed drive part 45 as the structure in this manner can make the gyro sensor 1 smaller.

By the above process, side etching takes place on the lateral surface on the side of the fixed drive part 45 of the first part 4301*a*. Consequently, the deep part width W2 of the first part 4301*a* at the deep-etched bottom part is smaller than the width W1 of the first part 4301*a* on a first main surface 431, where etching starts. Meanwhile, the first part 4301*b* has the space T2 from both the first part 4301*a* and the first part 4301*c* and therefore is formed with almost no side etching. Therefore, the width W1 of the first part 4301*b* on the first main surface 431, where etching starts, and the deep part width W3 of the first part 4301*b* at the deep-etched bottom part are substantially equal.

In this way, a difference in the cross-sectional shape is generated between the first part 4301*a* having a pattern with a higher aperture ratio on one side and the first part 4301*b* having no pattern with a higher aperture ratio. That is, the cross-sectional shape varies. This variation in the cross-sectional shape causes variation in the resonant frequency of the elastic part 43 (the first part 4301a and the other first parts 4301b, 4301c, 4301d) supporting the mass part 41. In other words, the resonant frequency of the mass part 41 supported by the elastic part 43 varies, affecting a detection signal in the gyro sensor element 4.

The first beams 4303 are arranged between the first part 4301a with a high aperture ratio (space T1) and the fixed drive part 45 and thus can reduce the aperture ratio of the first part 4301a on the side of the fixed drive part 45. The first beams 4303 are arranged to the side of the fixed drive part 45 from the first part 4301a in such a way that the space T3 from the first part 4301a satisfies 0.8<T3/T2<3.

The graph of FIG. 6B shows the correlation between the ratio (T1/T2 ratio) of the space T1 between the first part 4301a and the fixed drive part 45 to the space T2 between the first part 4301a and the next first part 4301b and the rate of change in the deep part width W2 in relation to the width W1 of the first part 4301a in the example shown in FIG. 6A. As shown in the graph of FIG. 6B, in the area where the T1/T2 ratio is 3.0 or higher, the rate of change in the deep part width W2 of the deep part in relation to the width W1 of the first main surface 431 of the first part 4301a exceeds 4%. The rate of change in the deep part width W2 exceeding 4% may generate variation in the resonant frequency of the elastic part 43. Therefore, it is not preferable to set a T1/T2 ratio that exceeds 3.0. In other words, it is preferable to arrange the first beams 4303 facing the first part 4301a in such a way that the T3/T2 ratio, which is the ratio of the space T3 between the first beams 4303 and the first part 4301a to the space T2 between the first part 4301a and the next first part 4301b, is less than 3.0 (T3/T2<3).

As shown in the graph of FIG. 6B, if the T1/T2 ratio is 0.8 or lower, that is, if the space (gap) is narrow, the microloading effect increases the width W1 of the first part 4301a. With a narrower space (gap) setting than this, etching does not penetrate this part. Therefore, it is preferable to set the first beams 4303 in such a way that the T3/T2 ratio, which is the ratio of the space T3 between the first beams 4303 and the first part 4301a to the space T2 between the first part 4301a and the next first part 4301b, satisfies 0.8<T3/T2<3.

In this way, in the elastic part 43, as the first beams 4303 are arranged in the first part 4301a in such a way that the T3/T2 ratio satisfies 0.8<T3/T2<3, the variation in the cross-sectional shape between the first part 4301a and the other first parts 4301b, 4301c, 4301d can be reduced, thus allowing the penetration of etching. Thus, the variation in the resonant frequency of the elastic part 43 (mass part 41) can be reduced.

It is more preferable that the space T3 between the first beams 4303 and the first part 4301a satisfies 0.8<T3/T2≤2.0. Setting the T3/T2 ratio in this way causes the rate of change in the deep part width W2 in relation to the width W1 of the first part 4301a to be as low as approximately 2%, as shown in the graph of FIG. 6B. The variation in the cross-sectional shape between the first part 4301a and the other first parts 4301b, 4301c, 4301d can be reduced further, thus allowing the penetration of etching. Thus, the variation in the resonant frequency of the elastic part 43 (mass part 41) can be reduced further.

Also, it is more preferable that the space T3 between the first beams 4303 and the first part 4301a satisfies 0.9≤T3/T2≤1.1. Setting the T3/T2 ratio in this way causes the rate of change in the deep part width W2 in relation to the width W1 of the first part 4301a to be 1% or less, resulting in very little change in the deep part width W2, as shown in the graph of FIG. 6B. The variation in the cross-sectional shape between the first part 4301a and the other first parts 4301b, 4301c, 4301d can be reduced even further, thus allowing the penetration of etching. Thus, the variation in the resonant frequency of the elastic part 43 (mass part 41) caused by the variation in the cross-sectional shape of the plurality of first parts 4301a, 4301b, 4301c, 4301d can be reduced significantly.

The first beams 4303 may not only be provided to the first part 4301a on the side of the fixed drive part 45 but may be provided to the first part 4301d on the side opposite to the fixed drive part 45. In this case, first beams 4303a are arranged via connecting parts 4304a in such a way as to face the first part 4301d on the side opposite to the first part 4301a. Here, the arrangement pattern (arrangement configuration) such as the space between the first part 4301d and the first beams 4303a may be set similarly to that of the first beams 4303 on the side of the fixed drive part 45.

The shape of the first parts 4301a, 4301b, 4301c, 4301d forming the elastic part 43 when viewed from a direction along the X-axis direction (lateral cross-sectional shape parallel to the YZ plane, which is a plane including the Y-axis and the Z-axis) is rectangular. The outer peripheral surface of the first parts 4301a, 4301b, 4301c, 4301d includes a first main surface 431 and a second main surface 432 as a pair of main surfaces (see FIG. 5), and a first lateral surface 433 and a second lateral surface 434 as a pair of lateral surfaces.

Each of the first main surface 431 and the second main surface 432 is a flat surface along the XY plane, which is a plane including the X-axis and the Y-axis. The first main surface 431 is a surface on the +Z-axis side (upper surface). The second main surface 432 is a surface on the −Z-axis side (lower surface). In this embodiment, each of the first main surface 431 and the second main surface 432 has a square wave-like shape and has parts extending along the X-axis direction and parts extending along the Y-axis direction.

The first lateral surface 433 is a surface on the −Y-axis side. The second lateral surface 434 is a surface on the +Y-axis side. In this embodiment, four first lateral surfaces 433 and four second lateral surfaces 434 are provided in one elastic part 43 (see FIG. 4). The side of the first lateral surface 433 on the +Z-axis side is connected to the first main surface 431 and its side on the −Z-axis side is connected to the second main surface 432. Meanwhile, the side of the second lateral surface 434 on the +Z-axis side is connected to the first main surface 431 and its side on the −Z-axis side is connected to the second main surface 432.

Now, as described above, the gyro sensor 1 has: the substrate 2; the fixed parts 42 fixed to the substrate 2; the drive parts 44 driven in the first direction along the Y-axis as the "first axis"; the detection parts (detectors) 471, 472, which can be displaced in the second direction along the Z-axis as the "second axis" orthogonal to the Y-axis by a Coriolis force acting on the drive parts 44; the mass part 41 connecting the drive parts 44 to the fixed parts 42; and the elastic parts 43 connecting the mass part 41 to the fixed parts 42. The outer peripheral surface of the elastic parts 43 includes the first main surface 431 and the second main surface 432 as the "main surface", and the first lateral surface 433 and the second lateral surface 434 as the "lateral surface".

Also, this embodiment has the elastic parts 43, which are displaced by the vibration of the drive parts 44, and the support beams 48, which are not displaced relatively to the vibration of the drive parts 44 but are displaced according to a Coriolis force. Therefore, there is little influence of the processing of the elastic parts 43 on the support beams 48. The support beams 48 may be displaceable in the Z-axis direction and may be, for example, torsion springs, folded springs, or leaf springs that are thin in the Z-axis direction.

In the gyro sensor 1 according to the first embodiment described above, the first beams 4303 are provided if the space T1 between the first part 4301a as the outer beam and the fixed drive part 45 as the structure and the space T2 between the first parts 4301a, 4301b, 4301c, 4301d as the plurality of beams have the relation of T2<T1. In other words, if the aperture ratio between the first part 4301a and the fixed drive part 45 is high, the first beams 4303 facing the first part 4301a are provided to the side of the fixed drive part 45 of the first part 4301a. The first beams 4303 can reduce the aperture ratio between the first part 4301a and the fixed drive part 45 nearly to the aperture ratio between the plurality of first parts 4301a, 4301b, 4301c, 4301d. Thus, even when deep etching (deep reactive ion etching) to the depth D1 of 20 μm to 30 μm (20 μm≤D1≤30 μm) is carried out, the variation in the cross-sectional shape due to the spreading of the etching gas can be reduced. This can reduce the variation in the resonant frequency of the elastic part 43 including the plurality of first parts 4301a, 4301b, 4301c, 4301d generated by the variation in the cross-sectional shape and thus can restrain the reduction in detection accuracy.

The space T1 can be defined as the distance between the first part 4301a and the fixed drive part 45 as the structure, in one gyro sensor element 4, as described above. However, this is not limiting. For example, when etching is carried out in the state where a plurality of gyro sensor elements 4 are arranged on a wafer, a site of the neighboring gyro sensor element 4 can be regarded as a structure, and the space T1 can be defined as the distance (space) between this structure and the first part 4301a, or the distance (space) between the frame (support frame) and the first part 4301a.

Second Embodiment

Figure 7:
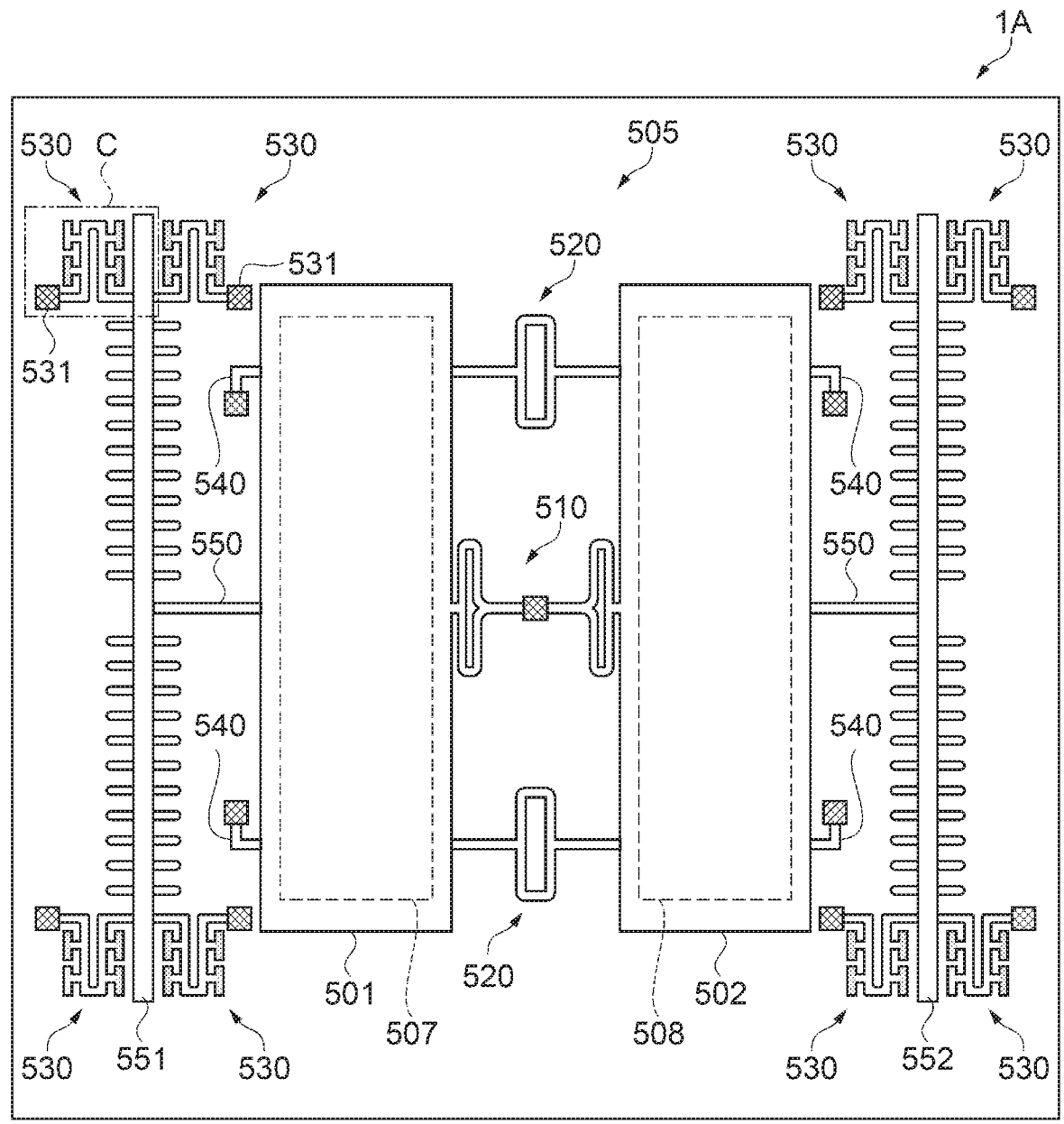
FIG. 7 is a plan view showing a schematic configuration of a gyro sensor according to a second embodiment of a physical quantity sensor.
Figure 7:
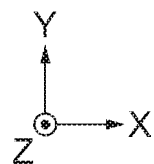
Figure 8:
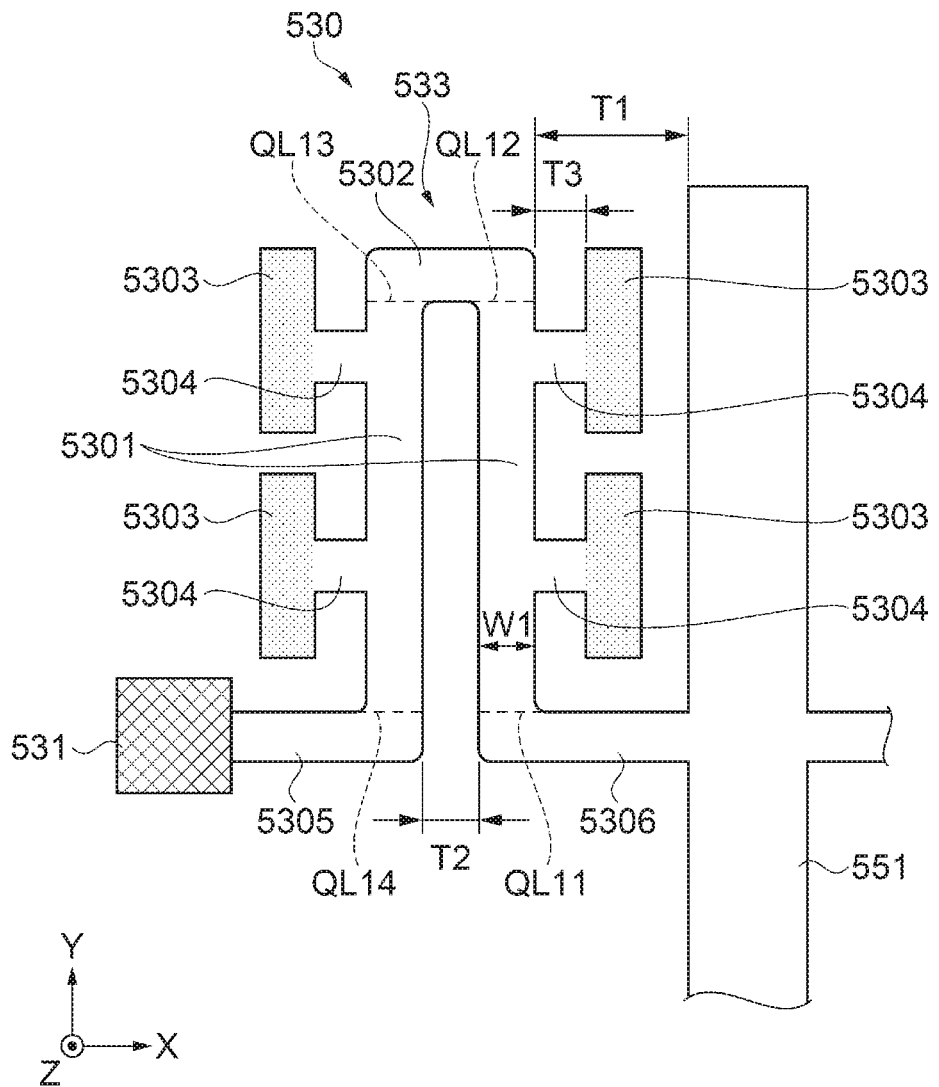
FIG. 8 is a plan view schematically showing a part (part C) of an elastic part shown in FIG. 7.

Next, a second embodiment of the physical quantity sensor will be described with reference to FIGS. 7 and 8. FIG. 7 is a plan view showing a schematic configuration of a gyro sensor according to the second embodiment of the physical quantity sensor. FIG. 8 is a plan view schematically showing a part (part C) of an elastic part shown in FIG. 7. In the description below, three axes orthogonal to each other, that is, X-axis, Y-axis, and Z-axis similar to those in the first embodiment are used. Also, in the description below, differences from the first embodiment are mainly described and similar matters are not described further in detail.

As shown in FIGS. 7 and 8, a gyro sensor 1A according to the second embodiment is an angular velocity sensor that can detect an angular velocity about the X-axis, as in the first embodiment. This gyro sensor 1A has a gyro sensor element (angular velocity sensor element) 505 as a sensor element, and a package (not illustrated) accommodating the gyro sensor element (angular velocity sensor element) 505, as shown in FIG. 7. The package is similar to that in the first embodiment and therefore is not described further in detail here.

The gyro sensor element 505 has two mass parts 501 (masses), 502 arranged next to each other in the X-axis direction, two fixed detection units (fixed detectors) 507, 508, a plurality of fixed parts 510, 540 including a support beam, a connecting beam 520, a plurality of elastic parts 530 (flexures), and a plurality of drive parts 551, 552. The two mass parts 501, 502 form symmetry in the + (positive) X-axis direction and the − (negative) X-axis direction and have similar configurations.

The mass parts 501, 502 are connected to the fixed part 510 including a support beam, the plurality of fixed parts 540 including a support beam, and the drive parts 551, 552. The mass part 501 and the mass part 502 are connected to each other via the connecting beam 520 provided on the +Y-axis side and the −Y-axis side of the fixed part 510. The mass parts 501, 502 include the fixed parts 510, 540, the connecting beam 520, the plurality of elastic parts 530, and the drive parts 551, 552, which are integrally formed.

The fixed part 510 including the support beam is arranged between the mass part 501 and the mass part 502 and supports the mass part 501 and the mass part 502 in a displaceable manner via the curved support beam. As the plurality of fixed parts 540 including the support beam, two fixed parts 540 are provided to the side of the drive part 551 of the mass part 501 and two fixed parts 540 are provided to the side of the drive part 552 of the mass part 502. The plurality of fixed parts 540 support the mass part 501 and the mass part 502 in a displaceable manner via the support beams.

The drive part 551 is connected to the mass part 501 via a support beam 550. The drive part 552 is arranged on the side opposite to the drive part 551 across the mass parts 501, 502 and is connected to the mass part 502 via a support beam 550. The respective drive parts 551, 552 are connected to parts extending along the Y-axis direction of the mass parts 501, 502. Each of the drive parts 551, 552 is in a comb-like shape having a trunk part extending in the Y-axis direction along the mass parts 501, 502 and a plurality of branch parts extending in the X-axis direction from the trunk part. Each of the drive parts 551, 552 is arranged facing a fixed drive part, not illustrated.

The fixed detection units (fixed detectors) 507, 508 (fixed detection electrodes) are provided facing the mass parts 501, 502, respectively. The fixed detection units (fixed detectors) 507, 508 are spaced apart from the mass parts 501, 502.

The plurality of elastic parts 530 are connected to each of the two ends of the trunk part of the drive parts 551, 552. That is, in this embodiment, four elastic parts 530 are provided. The plurality of elastic parts 530 are connected to the mass parts 501, 502 via the drive parts 551, 552. The plurality of elastic parts 530 are configured to be able to displace the drive parts 551, 552 within an XY plane. Each elastic part 530 has a square wave-like shape when viewed in a plan view from the Z-axis direction and includes first parts 5301 as a plurality of beams extending along the Y-axis direction and a second part 5302 forming a turnaround part 533 and extending along the X-axis direction (see FIG. 8).

As shown in FIG. 8, the elastic part 530 has a square wave-like shape, when viewed in a plan view from the Z-axis direction. The elastic part 530 has the elongate first parts 5301 as a plurality of beams extending along the Y-axis direction, the second part 5302 extending along the X-axis direction, a third part 5306 extending along the X-axis direction, a fourth part 5305 extending along the X-axis direction, and a plurality of first beams 5303 connected to each of the two first parts 5301. The space T1 in FIG. 8 is the space between the beam and the structure. The space T2 is the space between one beam and the next beam. The first parts 5301 are longer than the second part 5302. The first parts 5301 are the parts marked off by dashed lines QL11, QL12, QL13, QL14 shown in the illustration, as approximate boundaries.

The elastic part 530 in this embodiment has two first parts 5301. The two first parts 5301 are arranged parallel to each other with the space T2 between them. One first part 5301 has its one end connected to the trunk part of the drive part 551 via the third part 5306. Here, the space T1 between the first part 5301 and the trunk part of the drive part 551 satisfies the relation of T2<T1 with the space T2 between the one first part 5301 and the other first part 5301. The other first part 5301 has its one end connected to a fixed part 531 via the fourth part 5305. The second part 5302 connects the other end of the one first part 5301, which is on the side opposite to the third part 5306, and the other end of the other first part 5301, which is on the side opposite to the fourth part 5305. The first parts 5301 thus connected are turned around at the turnaround part 533 including the second part 5302 and thus form a square wave-like shape. It is preferable to configure the two first parts 5301 in such a way that the width W1 in the direction (X-axis direction) orthogonal to the longitudinal direction (Y-axis direction) satisfies $0<W1 \leq 2$ μm.

The first beams 5303 are arranged between the one first part 5301 and the trunk part of the drive part 551 as the structure. The first beams 5303 have a space T3 from the first part 5301 and are connected to the first part 5301 via connecting parts 5304. In this embodiment, two first beams 5303 are provided. The two first beams 5303 have a space at a position facing a center part in the longitudinal direction of the first part 5301 and extend along the longitudinal direction of the first part 5301. The first beams 5303 are approximately the hatched parts in the illustration.

It is preferable that the first beams 5303 are arranged facing the first part 5301 in such a way that the T3/T2 ratio, which is the ratio of the space T3 between the first beams 5303 and the first part 5301 to the space T2 between the first part 5301 and the next first part 5301, satisfies $0.8<T3/T2<3.0$. It is more preferable that the space T3 between the first beams 5303 and the first part 5301 satisfies $0.8<T3/T2 \leq 2.0$. It is even more preferable that the space T3 between the first beams 5303 and the first part 5301 satisfies $0.9 \leq T3/T2 \leq 1.1$.

As in the first embodiment, the first beams 5303 are provided particularly to reduce the variation in the cross-sectional shape of the first parts 5301 at the time of dry etching such as the Bosch process used to form the gyro sensor element 505. The variation in the cross-sectional shape is due to the uneven spreading of the etching gas at the time of dry etching, generated by the coarseness and fineness of the shape pattern at each site of the gyro sensor element 505. This is similar to the first embodiment and therefore is not described further in detail here.

The first beams 5303 may not only be provided to the first part 5301 on the side of the trunk part of the drive part 551 but may be provided to the first part 5301 on the side opposite to the arrangement side of the trunk part of the drive part 551 (on the side of the fixed part 531). In this case, the first beams 5303 are arranged via the connecting parts 5304 in such a way as to face the first part 5301 on the side of the fixed part 531. Here, the arrangement pattern (arrangement configuration) such as the space between the first part 5301 and the first beams 5303 may be set similarly to that of the first beams 5303 on the side of the trunk part of the drive part 551.

The shape of the elastic part 530 is not limited to the illustrated shape, provided that it can be elastically deformed in a desired driving direction. While the elastic part 530 in this embodiment is connected to each of the two ends of the trunk part of the drive part 551, this is not limiting. The elastic part 530 may be connected to any position where it can support the mass part 501 (drive part 551) to the fixed part 531 in a displaceable manner.

The configuration and advantages of the elastic part 530 having the first parts 5301 including the first beams 5303 are similar to those in the first embodiment and have already been described in detail above and therefore are not described further in detail here.

In the gyro sensor 1A according to the second embodiment, as in the gyro sensor 1 according to the first embodiment, the variation in the cross-sectional shape due to the spreading of the etching gas can be reduced. This can reduce the variation in the resonant frequency of the elastic part 530 including the plurality of first parts 5301 generated by the variation in the cross-sectional shape and thus can restrain the reduction in detection accuracy.

The space T1 can be defined as the distance between the first part 5301 and the trunk part of the drive part 551 as the structure, in one gyro sensor element 505, as in the above configuration. However, this is not limiting. For example, when etching is carried out in the state where a plurality of gyro sensor elements 505 are arranged on a wafer, the space T1 can be defined as the distance (space) between a site of the neighboring gyro sensor element 505 (structure) and the first part 5301, or the distance (space) between the frame (support frame) and the first part 5301.

Third Embodiment

Figure 9:
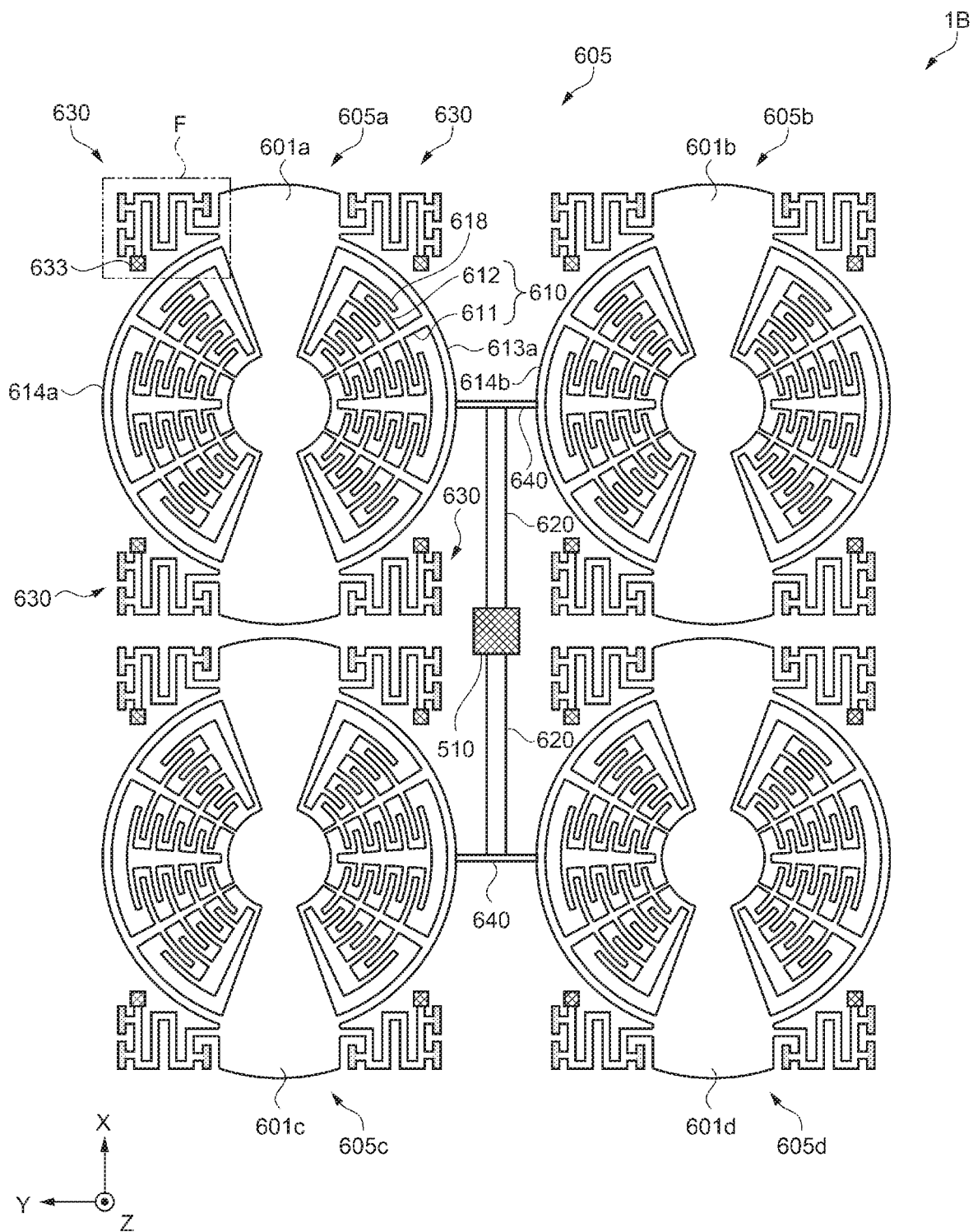
FIG. 9 is a plan view showing a schematic configuration of a gyro sensor according to a third embodiment of a physical quantity sensor.
Figure 10:
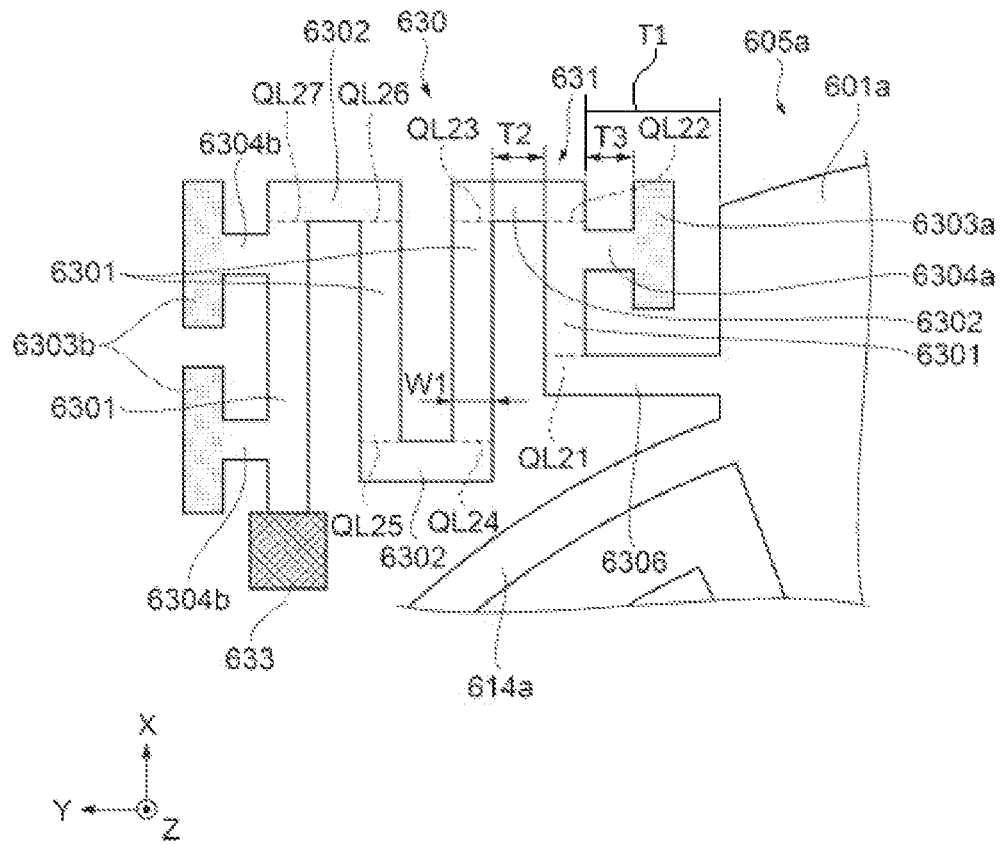
FIG. 10 is a plan view schematically showing a part (part F) of an elastic part shown in FIG. 9.

Next, a third embodiment of the physical quantity sensor will be described with reference to FIGS. 9 and 10. FIG. 9 is a plan view showing a schematic configuration of a gyro sensor according to the third embodiment of the physical quantity sensor. FIG. 10 is a plan view schematically showing a part (part F) of an elastic part shown in FIG. 9. In the description below, three axes orthogonal to each other, that is, X-axis, Y-axis, and Z-axis similar to those in the first embodiment are used. Also, in the description below, differences from the first embodiment are mainly described and similar matters are not described further in detail.

As shown in FIGS. 9 and 10, a gyro sensor 1B according to the third embodiment is an angular velocity sensor that can detect an angular velocity about the X-axis or the Y-axis. This gyro sensor 1B has a gyro sensor element (angular velocity sensor element) 605 as a sensor element, and a package (not illustrated) accommodating the gyro sensor element (angular velocity sensor element) 605, as shown in FIG. 9. The package is similar to that in the first embodiment and therefore is not described further in detail here.

The gyro sensor element 605 has four element bodies 605a, 605b, 605c, 605d arranged next to each other in the X-axis direction and the Y-axis direction, and four fixed detection units (fixed detectors) (not illustrated). The four element bodies 605a, 605b, 605c, 605d are situated in the +(positive) X and +Y-axis direction, the +X and – (negative) Y-axis direction, the –X and +Y-axis direction, and the –X and –Y-axis direction, as shown in FIG. 9, and have similar configurations.

The element bodies 605a, 605b, 605c, 605d have mass parts 601a, 601b, 601c, 601d, respectively. The element bodies 605a, 605b, 605c, 605d are supported in a displaceable manner to a fixed part 510 via a support beam 640 connecting the element body 605a and the element body 605b, a support beam 640 connecting the element body 605c and the element body 605d, and a connecting beam 620 connecting the two support beams 640 and the fixed part 510.

The configuration of the element body 605a will now be described as a representative example. The element body 605a has: the mass part 601a; outer frame parts 613a, 614a connecting an end part on the +X-axis direction side and an end part on the −X-axis direction side of the mass part 601a in an arc-like shape; a drive part 610 connected to the outer frame parts 613a, 614a; a fixed drive electrode 618 facing the drive part 610; and an elastic part 630 supporting the mass part 601a to a fixed part 633 in a displaceable manner. The mass part 601a, the outer frame parts 613a, 614a, the drive part 610, and the elastic part 630 forming the element body 605a are integrally formed, including the support beams 640 and the connecting beam 620 connecting the element bodies 605a, 605b, 605c, 605d to the fixed part 510.

The outer shape of the mass part 601a includes a circular center part, and roughly sectorial extension parts extending in both of the +X-axis direction and the −X-axis direction from the center part along the X-axis direction, when viewed in a plan view from the Z-axis direction (hereinafter simply referred to as "when viewed in a plan view").

The outer frame part 614a connects the outer edge part on the +X-axis direction side and the outer edge part on the −X-axis direction side of the mass part 601a, in an arc-like shape in the +Y-axis direction. The outer frame part 613a connects the outer edge part on the +X-axis direction side and the outer edge part on the −X-axis direction side of the mass part 601a, in an arc-like shape in the −Y-axis direction.

The drive part 610 is provided as two units each, between the outer frame part 613a and the mass part 601a and between the outer frame part 614a and the mass part 601a. The drive part 610 includes a plurality of trunk parts 611 connecting the outer frame parts 613a, 614a and the mass part 601a, and a plurality of branch parts 612 extending in an arc-like shape to both sides from the trunk parts 611. The plurality of branch parts 612 are arranged in an arc-like shape that is substantially concentric with the outer edge of the center part of the mass part 601a.

The fixed drive electrode 618 is arranged in the shape of an arc-like comb that is substantially concentric with the outer edge of the center part of the mass part 601a, so as to face each of the branch parts 612 arranged on both sides of the trunk parts 611 of the drive part 610.

A plurality of elastic parts 630 are connected to the four corner parts of each of the mass parts 601a, 601b, 601c, 601d. That is, in this embodiment, the elastic parts 630 are provided at 16 positions. The configuration of the element body 605a will now be described as a representative example. Each of the plurality of elastic parts 630 has its one end connected to the fixed part 633 and has its other end connected to the mass part 601a. The plurality of elastic parts 630 are configured to be able to displace the mass part 601a. As shown in FIG. 10, each elastic part 630 has a square wave-like shape when viewed in a plan view and includes first parts 6301 as a plurality of beams extending along the X-axis direction and a second part 6302 forming a turnaround part 631 and extending along the Y-axis direction.

As shown in FIG. 10, the elastic part 630 has the elongate first parts 6301 as a plurality of beams extending along the X-axis direction, the second part 6302 extending along the Y-axis direction, a third part 6306 extending along the Y-axis direction, and a plurality of first beams 6303a, 6303b connected to each of the two first parts 6301. The space T1 in FIG. 10 is the space between the beam (first part 6301) and the structure (mass part 601a). The space T2 is the space between one beam (first part 6301) and the next beam (first part 6301). The first parts 6301 are longer than the second part 6302. The first parts 6301 are the parts marked off by dashed lines QL21, QL22, QL23, QL24, QL25, QL26, QL27 shown in the illustration, as approximate boundaries. The second part 6302 forms the so-called turnaround part 631, which connects two end parts of one first part 6301 and the next first part 6301 and thus forms a turnaround. The plurality of first parts 6301 are turned around at the turnaround part 631 including the second part 6302 and thus form a square wave-like shape. The elastic part 630 has its one end connected to the mass part 601a via the third part 6306 and has its other end connected to the fixed part 633.

The elastic part 630 in this embodiment has a plurality of first parts 6301. The plurality of first parts 6301 are arranged parallel to each other with the space T2 between them. In the first part 6301 on the side of the mass part 601a (on the −Y-axis direction side), the end on the side opposite to the turnaround part 631 is connected to the mass part 601a via the third part 6306. Here, the space T1 between the first part 6301 and the mass part 601a as the structure satisfies the relation of T2<T1 with the space T2 between the one first part 6301 and the other first part 6301. In the first part 6301 on the side of the fixed part 633 (on the +Y-direction side), the end on the side opposite to the turnaround part 631 is connected to the fixed part 633. The second part 6302 connects the ends of the first parts 6301 next to each other and thus forms the turnaround part 631. The plurality of first parts 6301 thus connected are turned around at the turnaround part 631 including the second part 6302 and thus form a square wave-like shape. It is preferable to configure the plurality of first parts 6301 in such a way that the width W1 in the direction (Y-axis direction) orthogonal to the longitudinal direction (X-axis direction) satisfies 0<W1≤2 (μm).

The first beam 6303a is arranged between the first part 6301 on the side of the mass part 601a (on the −Y-axis direction side) and the mass part 601a as the structure. The first beam 6303a has a space T3 from the first part 6301 and is connected to the first part 6301 via a connecting part 6304a. The first beam 6303a extends along the longitudinal direction of the first part 6301.

It is preferable that the first beam 6303a is arranged facing the first part 6301 in such a way that the T3/T2 ratio, which is the ratio of the space T3 between the first beam 6303a and the first part 6301 to the space T2 between the first part 6301 and the next first part 6301, satisfies 0.8<13/12<3.0. It is more preferable that the space T3 between the first beam 6303a and the first part 6301 satisfies 0.8<T3/T2≤2.0. It is even more preferable that the space T3 between the first beam 6303a and the first part 6301 satisfies 0.9≤T3/T2≤1.1.

As in the first embodiment, the first beam 6303a is provided particularly to reduce the variation in the cross-sectional shape of the first part 6301 at the time of dry etching such as the Bosch process used to form the gyro sensor element 605. The variation in the cross-sectional shape is due to the uneven spreading of the etching gas at the time of dry etching, generated by the coarseness and fineness of the shape pattern at each site of the gyro sensor element 605. This is similar to the first embodiment and therefore is not described further in detail here.

The first beam 6303a may not only be provided to the first part 6301 on the side of the mass part 601a but may be provided to the first part 6301 on the side opposite to the arrangement side of the mass part 601a (on the side of the fixed part 633). In this case, as shown in FIG. 10, the first beams 6303b are arranged via connecting parts 6304b in such a way as to face the first part 6301 on the side of the fixed part 633. Here, the arrangement pattern (arrangement configuration) such as the space between the first part 6301 and the first beams 6303b may be set similarly to that of the first beam 6303a on the side of the mass part 601a.

The shape of the elastic part 630 is not limited to the illustrated shape, provided that it can be elastically deformed in a desired driving direction. While the elastic part 630 in this embodiment is connected to both lateral sides of the mass part 601a, this is not limiting. The elastic part 630 may be connected to any position where it can support the mass part 601a to the fixed part 633 in a displaceable manner, such as on both end sides in the X-axis direction of the mass part 601a.

The configuration and advantages of the elastic part 630 having the first parts 6301 including the first beams 6303a, 6303b are similar to those in the first embodiment and have already been described in detail above and therefore are not described further in detail here.

In the gyro sensor 1B according to the third embodiment, as in the gyro sensor 1 according to the first embodiment, the variation in the cross-sectional shape due to the spreading of the etching gas can be reduced. This can reduce the variation in the resonant frequency of the elastic part 630 including the plurality of first parts 6301 generated by the variation in the cross-sectional shape and thus can restrain the reduction in detection accuracy.

The space T1 can be defined as the distance between the first part 6301 and the mass part 601a as the structure, in one gyro sensor element 605, as in the above configuration. However, this is not limiting. For example, when etching is carried out in the state where a plurality of gyro sensor elements 605 are arranged on a wafer, the space T1 can be defined as the distance (space) between the structure of the neighboring gyro sensor element 605 and the first part 6301, or the distance (space) between the frame (support frame) and the first part 6301.

Composite Sensor

Figure 11:
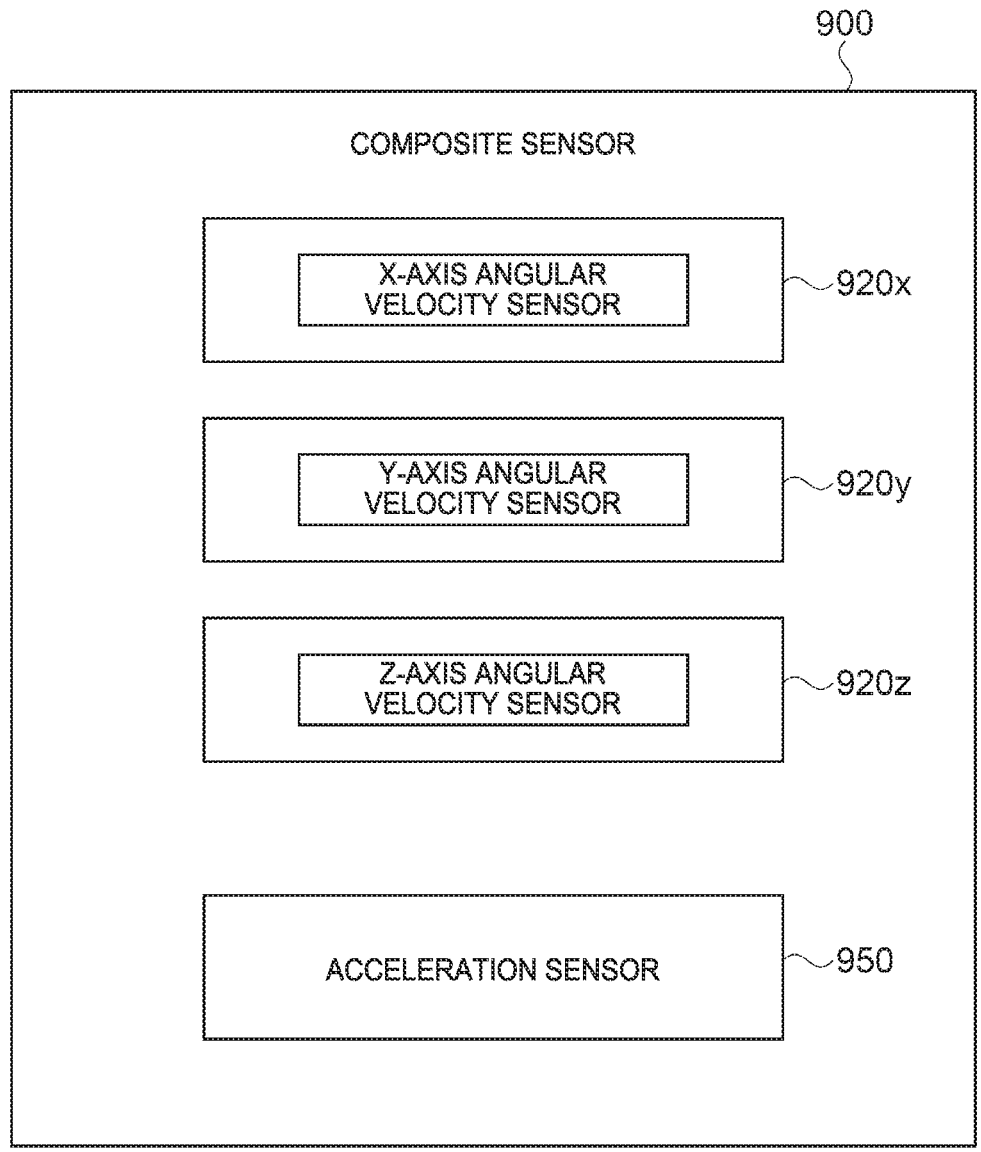
FIG. 11 is a functional block diagram showing a schematic configuration of a composite sensor.

Next, an example of configuration of a composite sensor having one of the gyro sensors 1, 1A, 1B will be described with reference to FIG. 11. FIG. 11 is a functional block diagram showing a schematic configuration of the composite sensor.

A composite sensor 900 shown in FIG. 11 functions as a so-called 6-axis motion sensor which has an acceleration sensor for three axes and an angular velocity sensor for three axes and which detects an attitude and behavior (amount of inertial motion) of a moving body (installation target device) such as an automobile or robot.

As shown in FIG. 11, the composite sensor 900 has three angular velocity sensors 920x, 920y, 920z, each of which can detect an angular velocity about one axis, and an acceleration sensor 950 that can detect accelerations about three axes. The angular velocity sensors 920x, 920y, 920z are not particularly limited and can be one of the gyro sensors 1, 1A, 1B utilizing a Coriolis force. Each of the angular velocity sensors 920x, 920y, 920z is a sensor in which the reduction in detection accuracy is reduced as in the embodiments and can detect an angular velocity with stability and high accuracy. As the acceleration sensor 950, separate sensors may be provided for measuring an acceleration in each of the three axes.

Such a composite sensor 900 can be easily formed by the angular velocity sensors 920x, 920y, 920z utilizing one of the gyro sensors 1, 1A, 1B according to the embodiments and the acceleration sensor 950 capable of detecting accelerations about three axes. Thus, with the composite sensor 900, for example, angular velocity data and acceleration data can easily be acquired.

Inertial Measurement Unit

Figure 12:
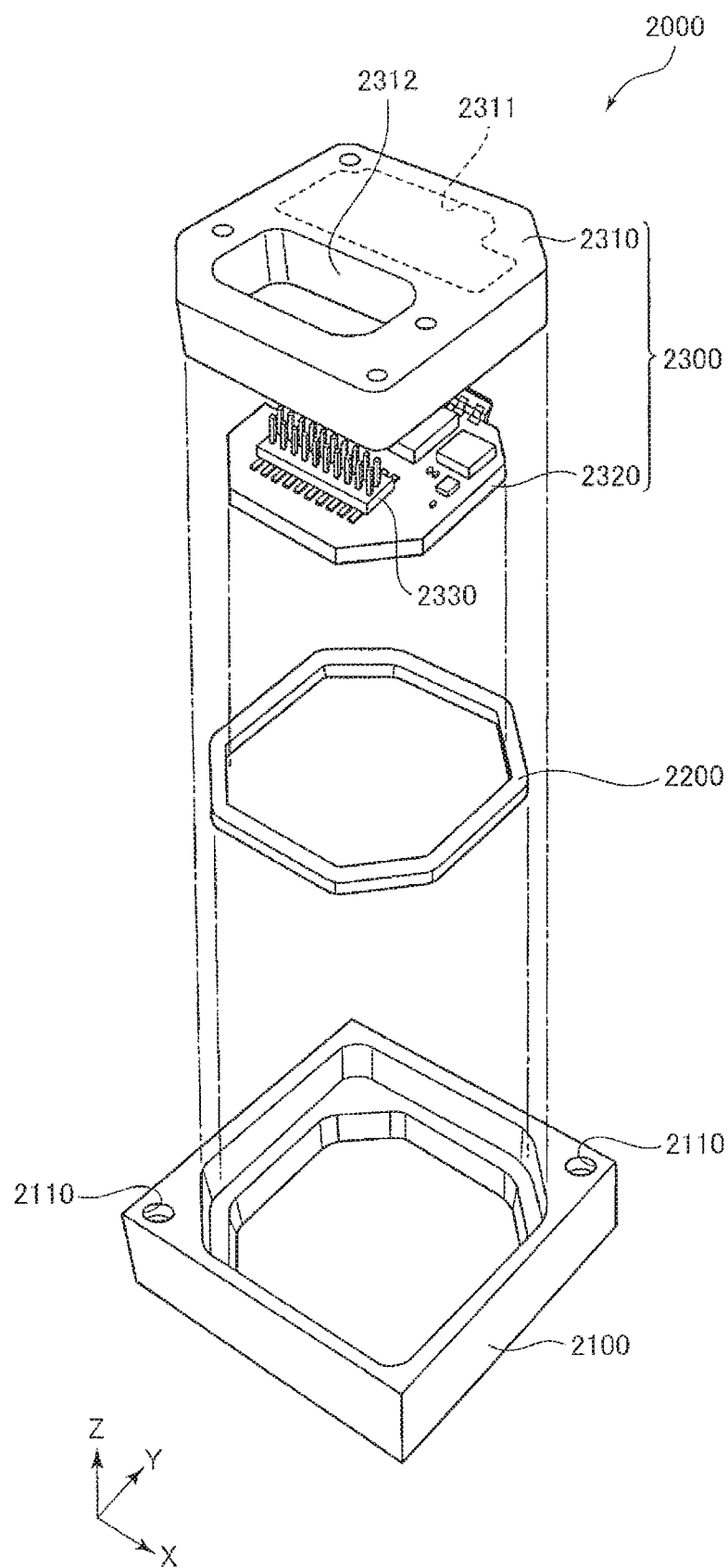
FIG. 12 is an exploded perspective view showing a schematic configuration of an inertial measurement unit.
Figure 13:
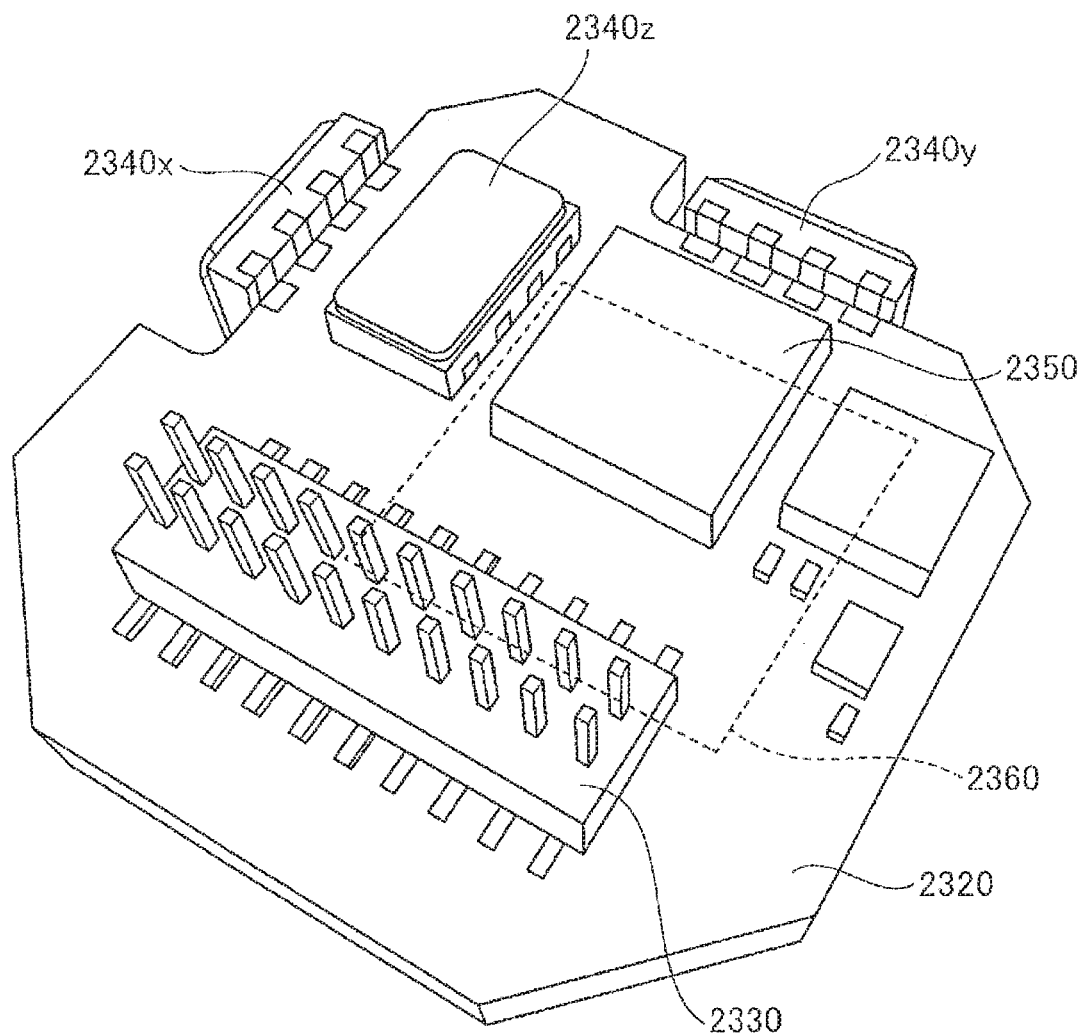
FIG. 13 is a perspective view showing an arrangement example of an inertial sensor element of the inertial measurement unit.
Figure 13:
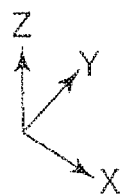

Next, an inertial measurement unit (IMU) will be described with reference to FIGS. 12 and 13. FIG. 12 is an exploded perspective view showing a schematic configuration of the inertial measurement unit. FIG. 13 is a perspective view showing an arrangement example of an inertial sensor element of the inertial measurement unit.

An inertial measurement unit 2000 (IMU) shown in FIG. 12 is a device which detects an attitude and behavior (amount of inertial motion) of a moving body (installation target device) such as an automobile or robot. The inertial measurement unit 2000 functions as a so-called 6-axis motion sensor having an acceleration sensor for three axes and an angular velocity sensor for three axes.

The inertial measurement unit 2000 is a rectangular parallelepiped which is substantially square when viewed in a plan view. Near two vertices situated in a diagonal direction of the square, screw holes 2110 as fixing parts are formed. Two screws can be inserted into the two screw holes 2110, thus fixing the inertial measurement unit 2000 onto an installation target surface of an installation target object such as an automobile. Properly selecting components or changing design enables miniaturizing the inertial measurement unit 2000 into a size that can be installed, for example, on a smartphone or digital camera.

The inertial measurement unit 2000 has an outer case 2100, a joining member 2200, and a sensor module 2300. The sensor module 2300 is inserted in the outer case 2100 via the joining member 2200. The sensor module 2300 has an inner case 2310 and a substrate 2320.

The outer shape of the outer case 2100 is a rectangular parallelepiped which is substantially square when viewed in a plan view, similarly to the overall shape of the inertial measurement unit 2000. The screw holes 2110 are formed near two vertices in a diagonal direction of the square. The outer case 2100 is in the shape of a box, with the sensor module 2300 accommodated inside.

The inner case 2310 is a member supporting the substrate 2320 and has a shape to fit inside the outer case 2100. In the inner case 2310, a recess 2311 for preventing contact with the substrate 2320 and an opening 2312 for exposing a connector 2330, described later, are formed. Such an inner case 2310 is bonded to the outer case 2100 via the joining member 2200 (for example, a packing impregnated with an adhesive). The substrate 2320 is bonded to a lower surface of the inner case 2310 via an adhesive.

As shown in FIG. 13, on an upper surface of the substrate 2320, components such as the connector 2330, an angular velocity sensor 2340z which detects an angular velocity about the Z-axis, and an acceleration sensor 2350 which detects an acceleration in each of the X-axis, Y-axis, and Z-axis directions, are installed. On lateral surfaces of the substrate 2320, an angular velocity sensor 2340x which detects an angular velocity about the X-axis, and an angular velocity sensor 2340y which detects an angular velocity about the Y-axis are installed. The angular velocity sensors 2340z, 2340x, 2340y are not particularly limited and can be one of the gyro sensors 1, 1A, 1B using a Coriolis force. The acceleration sensor 2350 is not particularly limited and can be an electrostatic acceleration sensor or the like.

On a lower surface of the substrate 2320, a control IC 2360 is installed. The control IC 2360 is a MCU (micro controller unit) and has a storage unit including a non-volatile memory and an A/D converter or the like built inside. The control IC 2360 thus controls each part of the inertial measurement unit 2000. In the storage unit, a program prescribing an order and content for detecting acceleration and angular velocity, a program for digitizing detection data and incorporating the detection data into packet data, and accompanying data and the like are stored. In addition to these components, a plurality of other electronic components is installed on the substrate 2320.

The inertial measurement unit 2000 has been described above. Such an inertial measurement unit 2000 includes the angular velocity sensors 2340z, 2340x, 2340y, the acceleration sensor 2350, and the control IC 2360 (control circuit) for controlling driving of the sensors 2340z, 2340x, 2340y, 2350. Thus, the inertial measurement unit 2000 can achieve the effects of the foregoing gyro sensor 1 and can realize high reliability.

Portable Electronic Apparatus

Next, a portable electronic apparatus using one of the gyro sensors 1, 1A, 1B will be described in detail with reference to FIGS. 14 and 15. As an example of the portable electronic apparatus, a wristwatch-type activity tracker (active tracker) utilizing the gyro sensor 1 will be described below.

Figure 14:
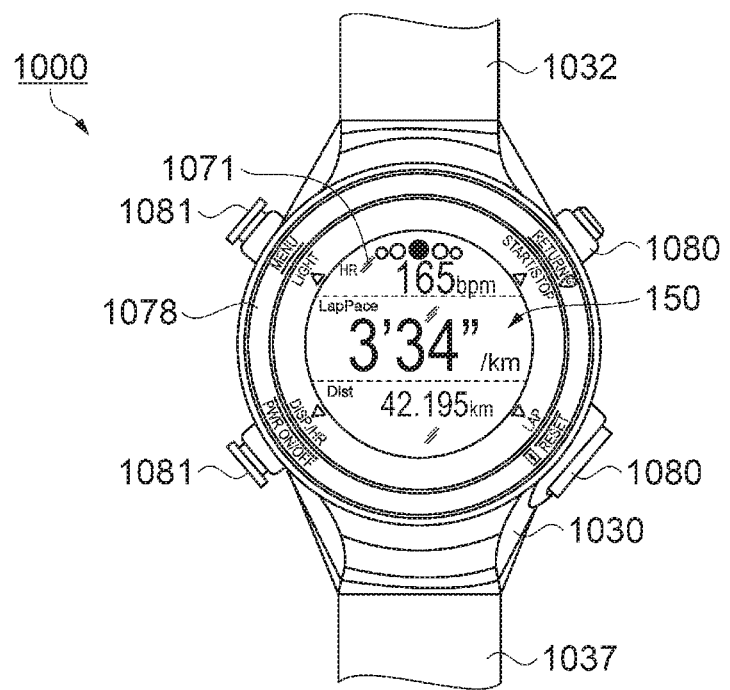
FIG. 14 is a plan view schematically showing a configuration of a portable electronic apparatus.
Figure 15:
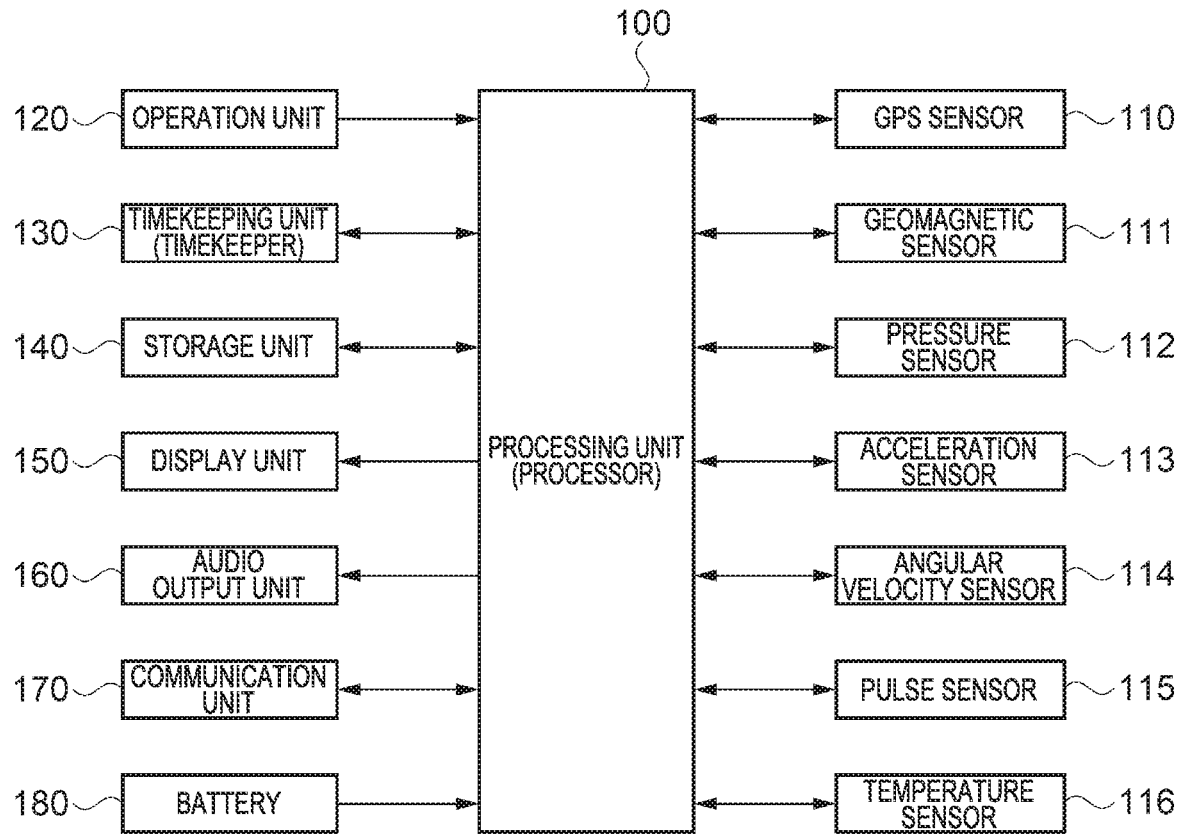
FIG. 15 is a functional block diagram showing a schematic configuration of the portable electronic apparatus.

A wrist device 1000, which is a wristwatch-type activity tracker (active tracker), is installed at a site (subject) such as a user's wrist with straps 1032, 1037 or the like, as shown in FIG. 14. The wrist device 1000 has a digital display unit 150 and can communicate wirelessly. The gyro sensor 1 according to the foregoing embodiment is incorporated in the wrist device 1000 as an angular velocity sensor 114 (see FIG. 15) which measures an angular velocity, together with a sensor for measuring an acceleration, or the like.

The wrist device 1000 has a case 1030 which accommodates at least the angular velocity sensor 114 (see FIG. 15), a processing unit (processor) 100 (see FIG. 15) which is accommodated in the case 1030 and processes output data from the angular velocity sensor 114, a display unit 150 accommodated in the case 1030, and a light-transmissive cover 1071 closing the opening of the case 1030. A bezel 1078 is provided on the outside of the light-transmissive cover 1071 of the case 1030. On the lateral side of the case 1030, a plurality of operation buttons 1080, 1081 are provided. The wrist device 1000 will now be described further in detail, also with reference to FIG. 15.

An acceleration sensor 113 detects an acceleration in each of three axial directions intersecting each other (ideally, orthogonal to each other) and outputs a signal (acceleration signal) corresponding to the magnitude and direction of the detected accelerations on the three axes. The angular velocity sensor 114 detects an angular velocity in each of three axial directions intersecting each other (ideally, orthogonal to each other) and outputs a signal (angular velocity signal) corresponding to the magnitude and direction of the detected angular velocities on the three axes.

A liquid crystal display (LCD) forming the display unit 150 displays, for example, location information using a GPS sensor 110 and a geomagnetic sensor 111, motion information such as the amount of movement or the amount of motion using the acceleration sensor 113 or the angular velocity sensor 114 or the like, biological information such as pulse rate using a pulse sensor 115 or the like, or time information such as the current time, according to various detection modes. The display unit 150 can also display ambient temperature using a temperature sensor 116.

A communication unit 170 carries out various kinds of control to establish communication between a user terminal and an information terminal, not illustrated. The communication unit 170 includes a transmitter/receiver conforming to a short-range wireless communication standard such as Bluetooth (trademark registered) (including BILE (Bluetooth Low Energy)), Wi-Fi (trademark registered) (Wireless Fidelity), Zigbee (trademark registered), NFC (Near Field Communication), or ANT+ (trademark registered), and a connector conforming to a communication bus standard such as USB (Universal Serial Bus).

The processing unit 100 (processor) is made up of, for example, an MPU (micro processing unit), DSP (digital signal processor), ASIC (application specific integrated circuit), or the like. The processing unit (processor) 100 executes various kinds of processing, based on a program stored in a storage unit 140 and a signal inputted from an operation unit 120 (for example, operation buttons 1080, 1081). The processing by the processing unit (processor) 100 includes data processing on an output signal from each of the GPS sensor 110, the geomagnetic sensor 111, a pressure sensor 112, the acceleration sensor 113, the angular velocity sensor 114, the pulse sensor 115, the temperature sensor 116, and a timekeeping unit (timekeeper) 130, display processing to cause the display unit 150 to display an image, audio output processing to cause an audio output unit 160 to output a sound, communication processing to communicate with an information terminal via the communication unit 170, and power control processing to supply electric power from a battery 180 to each part, or the like.

Such a wrist device 1000 can have at least the following functions.

1. Distance: to measure the total distance (moving distance) and the trajectory of movement from the start of measurement by highly accurate GPS functions.
2. Pace: to display the current traveling pace, based on a pace distance measurement value.
3. Average speed: to calculate and display the average speed from the start of traveling to the present.
4. Elevation above sea level: to measure and display the elevation above sea level by GPS functions.
5. Stride: to measure and display the stride even in a tunnel or the like which GPS radio waves do not reach.
6. Pitch: to measure and display the number of steps taken per minute.
7. Heart rate: to measure and display heart rate by the pulse sensor.
8. Gradient: to measure and display the gradient of the ground in training in mountains or trail running.
9. Auto lap: to automatically measure laps when the user runs a predetermined distance or for a predetermined time that is set in advance.
10. Calories burned by exercise: to display calories burned.
11. Number of steps taken: to display the total number of steps taken from the start of exercise.

The wrist device 1000 can be broadly applied to various watches such as running watch, runner's watch, runner's watch for multiple sports including duathlon and triathlon, outdoor watch, and satellite positioning system such as GPS watch equipped with the GPS.

While the GPS (Global Positioning System) is used as the satellite positioning system in the above description, other global navigation satellite systems (GNSS) may also be used. For example, one, or two or more of satellite positioning systems such as EGNOS (European Geostationary-Satellite Navigation Overlay Service), QZSS (Quasi Zenith Satellite System), GLONASS (Global Navigation Satellite System), GALILEO, and BeiDou (BeiDou Navigation Satellite System) may be used. Also, as at least one of the satellite positioning systems, a stationary satellite-based augmentation system (SBAS) such as WAAS (Wide Area Augmentation System) or EGNOS (European Geostationary-Satellite Navigation Overlay Service) may be used.

Such a portable electronic apparatus has the gyro sensor 1 and the processing unit (processor) 100 and is therefore very reliable.

Electronic Apparatus

Next, an electronic apparatus using one of the gyro sensors 1, 1A, 1B will be described in detail with reference to FIGS. 16 to 18. In the description below, a configuration using the gyro sensor 1 is described as an example.

First, a mobile personal computer as an example of the electronic apparatus is described with reference to FIG. 16. FIG. 16 is a perspective view schematically showing the configuration of the mobile personal computer as an example of the electronic apparatus.

In this illustration, a personal computer 1100 is made up of a main body section 1104 having a keyboard 1102, and a display unit 1106 having a display section 1108. The display unit 1106 is supported in such a way as to be able to pivot about the main body section 1104 via a hinge structure. The gyro sensor 1 functioning as an angular velocity sensor is built in such a personal computer 1100. Based on detection data from the gyro sensor 1, a control unit (controller) 1110 can perform control such as attitude control.

Figure 17:
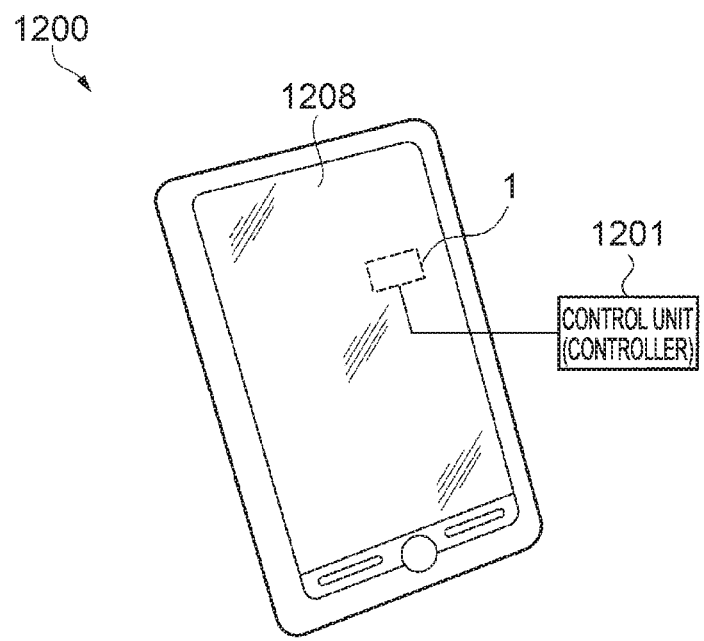
FIG. 17 is a perspective view schematically showing a configuration of a smartphone (mobile phone) as an example of an electronic apparatus.

FIG. 17 is a perspective view schematically showing the configuration of a smartphone (mobile phone) as an example of the electronic apparatus.

In this illustration, the gyro sensor 1 is incorporated in a smartphone 1200. Detection data (angular velocity data) detected by the gyro sensor 1 is transmitted to a control unit (controller) 1201 of the smartphone 1200. The control unit (controller) 1201 includes a CPU (central processing unit). The control unit (controller) 1201 thus can recognize the attitude and behavior of the smartphone 1200, based on the received detection data, and can change a display image displayed on a display unit 1208, output a warning sound or a sound effect, and drive a vibration motor to vibrate the main body. In other words, the control unit (controller) 1201 can carry out motion sensing of the smartphone 1200, and change the display content or generate a sound or vibration, based on the measured attitude and behavior. Particularly, when executing a game application, the user can enjoy a sense of reality.

Figure 18:
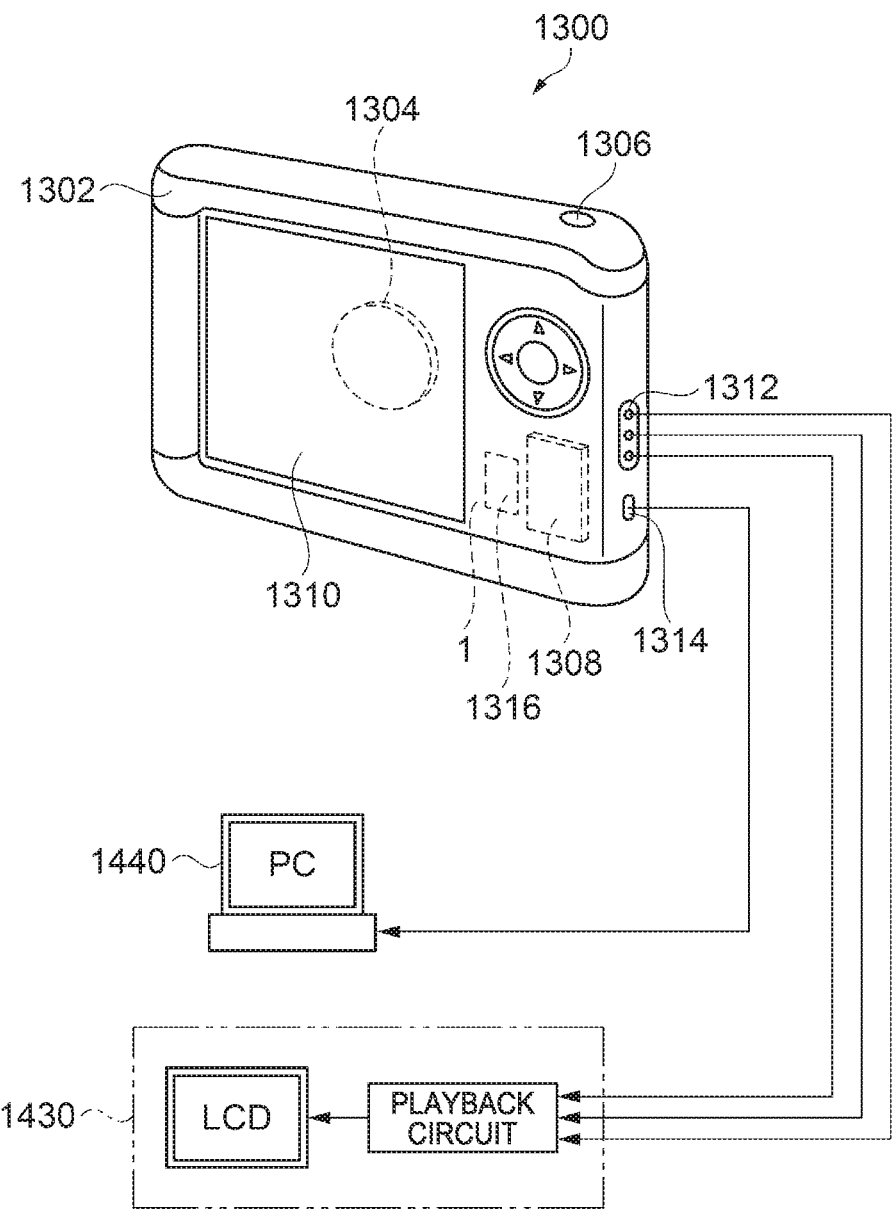
FIG. 18 is a perspective view showing a configuration of a digital still camera as an example of an electronic apparatus.

FIG. 18 is a perspective view showing the configuration of a digital still camera as an example of the electronic apparatus. This illustration also shows connections to external devices in a simplified manner.

In this illustration, a display unit 1310 is provided on the back side of a case (body) 1302 of a digital still camera 1300, to display an image based on a picked-up image signal from a CCD. The display unit 1310 also functions as a viewfinder showing a subject as an electronic image. On the front side (back side in the illustration) of the case 1302, a light receiving unit 1304 including an optical lens (image pickup optical system) and a CCD or the like is provided.

The photographer confirms a subject image displayed on the display unit 1310 and presses a shutter button 1306. In response to this, a picked-up image signal from the CCD at that point is transferred to and stored in a memory 1308. On a lateral side of the case 1302 of the digital still camera 1300, a video signal output terminal 1312 and a data communication input/output terminal 1314 are provided. As illustrated, a television monitor 1430 is connected to the video signal output terminal 1312, and a personal computer 1440 is connected to the data communication input/output terminal 1314, according to need. Also, in response to a predetermined operation, the picked-up image signal stored in the memory 1308 is outputted to the television monitor 1430 and the personal computer 1440. The gyro sensor 1 functioning as an angular velocity sensor is built in such a digital still camera 1300. Based on detection data from the gyro sensor 1, a control unit (controller) 1316 can perform control such as camera shake correction.

Such electronic apparatuses have the gyro sensor 1 and the control units (controllers) 1110, 1201, 1316 and are therefore very reliable.

Figure 16:
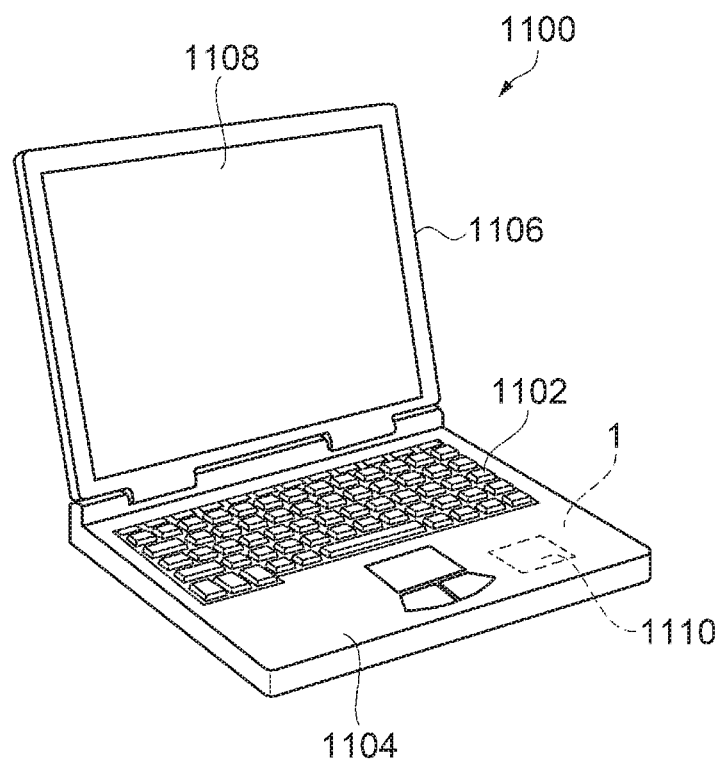
FIG. 16 is a perspective view schematically showing a configuration of a mobile personal computer as an example of an electronic apparatus.

The electronic apparatus having the gyro sensor 1 can be applied not only to the personal computer of FIG. 16, the smartphone (mobile phone) of FIG. 17, and the digital still camera of FIG. 18, but also to a tablet terminal, timepiece, inkjet ejection device (for example, inkjet printer), laptop personal computer, television, video camera, video tape recorder, car navigation device, pager, electronic organizer (including electronic organizer with communication functions), electronic dictionary, electronic calculator, electronic game device, word processor, workstation, videophone, security monitor, electronic binoculars, POS terminal, medical equipment (for example, electronic body thermometer, blood pressure monitor, blood sugar monitor, electrocardiograph, ultrasonic diagnostic device, electronic endoscope), fishfinder, various measuring devices, instruments (for example, instruments of vehicle, aircraft, ship), flight simulator, seismometer, pedometer, clinometer, vibration gauge which measures vibrations of a hard disk, attitude control device for a robot or a flying object such as a drone, control device used for inertial navigation for automatic driving of an automobile, and the like.

Vehicle

Figure 19:
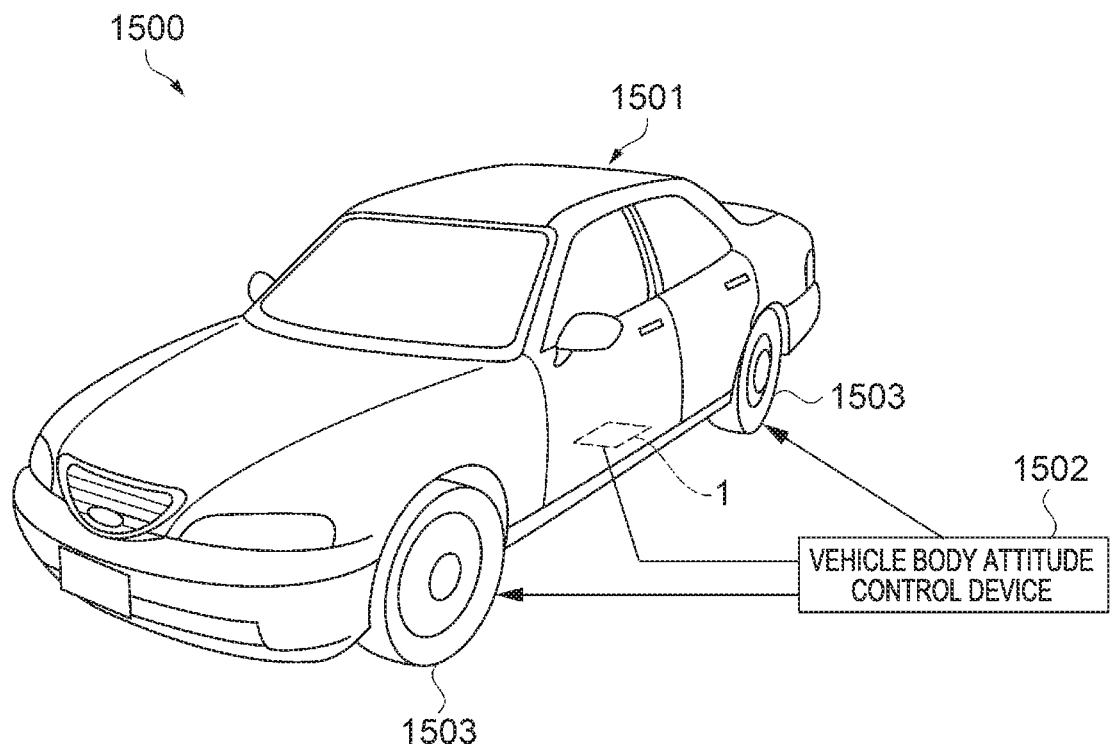
FIG. 19 is a perspective view showing a configuration of an automobile as an example of a vehicle.

Next, a vehicle using one of the gyro sensors 1, 1A, 1B is shown in FIG. 19 and described in detail. In the description below, a configuration using the gyro sensor 1 is described as an example. FIG. 19 is a perspective view showing the configuration of an automobile as an example of the vehicle.

As shown in FIG. 19, the gyro sensor 1 is built in an automobile 1500. For example, the gyro sensor 1 can detect the attitude of a vehicle body 1501. A detection signal from the gyro sensor 1 is supplied to a vehicle body attitude control device 1502 as an attitude control unit (attitude controller) which controls the attitude of the vehicle body. Based on the signal, the vehicle body attitude control device 1502 can detect the attitude of the vehicle body 1501 and can control stiffness/softness of suspension or control braking on individual wheels 1503 according to the result of the detection. The gyro sensor 1 can also be applied broadly to keyless entry system, immobilizer, car navigation system, car air-conditioning, anti-lock braking system (ABS), airbags, tire pressure monitoring system (TPMS), engine control system (engine system), control device for automatic driving inertial navigation, and electronic control unit (ECU) such as battery monitor for hybrid car or electric vehicle.

The gyro sensor 1 applied to the vehicle can also be applied to, for example, attitude control of a biped robot, train or the like, attitude control of remote-controlled or autonomous flying object such as radio-controlled airplane, radio-controlled helicopter, or drone, attitude control of agricultural machinery (farm machine) or construction machinery (building machine), and control of rocket, artificial satellite, ship, AGV (automated guided vehicle), or biped robot, in addition to the foregoing examples. As described above, to implement attitude control of various vehicles, the gyro sensor 1 and a control unit (controller) (not illustrated) for each vehicle are incorporated in each vehicle.

Such a vehicle has the gyro sensor 1 and the control unit (controller) (for example, vehicle body attitude control device 1502 as the attitude control unit (attitude controller)) and is therefore very reliable.

The physical quantity sensor, the composite sensor, the inertial measurement unit, the portable electronic apparatus, the electronic apparatus, and the vehicle have been described above, based on the illustrated embodiments. However, the invention is not limited to these embodiments. The configuration of each part can be replaced by any configuration having similar functions. Also, other arbitrary components may be added to the invention.

In the embodiments, the X-axis, the Y-axis, and the Z-axis are orthogonal to each other. However, these axes are not limited to being orthogonal to each other, provided that these axes intersect each other. For example, the X-axis may slightly tilt from the direction of the normal line to the YZ plane. The Y-axis may slightly tilt from the direction of the normal line to the XZ plane. The Z-axis may slightly tilt from the direction of the normal line to the XY plane. The term "slightly" refers to such an extent that the physical quantity sensor (gyro sensor 1) can achieve its effects. The specific tilt angle (numerical value) varies depending on the configuration or the like.

What is claimed is:

1. An inertial measurement unit comprising:
   an angular velocity sensor;
   an acceleration sensor;
   a micro controller unit configured to control the angular velocity sensor and the acceleration sensor; and
   a main board on which the angular velocity sensor, the acceleration sensor, and the micro controller unit are mounted,
   wherein the angular velocity sensor comprises:
      three mutually orthogonal axes being defined as an X-axis, a Y-axis, and a Z-axis;
      a substrate; and
      a sensor element supported on an upper surface of the substrate, the upper surface being located on a positive side of the Z axis, the sensor element being configured to detect a change in capacitance,
   wherein the sensor element comprises:
      a structure arranged on the upper surface of the substrate;
      an elastic part arranged on the upper surface of the substrate and connected to the structure,
      wherein the elastic part includes an inner beam and an outer beam arranged in parallel with each other,
      the outer beam is arranged between the inner beam and the structure,
      the elastic part includes a first beam parallel to the outer beam, the first beam includes a pair of ends, and each end is a free end,
      in a plan view along the Z-axis, the first beam is arranged between the outer beam and the structure, and
      T2<T1, wherein a distance between the outer beam and the structure is T1, and a distance between the inner beam and the outer beam is T2.

2. The inertial measurement unit according to claim 1, wherein
   $0.8 < T3/T2 < 3.0$, and
   a distance between the outer beam and the first beam is T3.

3. The inertial measurement unit according to claim 2, wherein
   $0.8 < T3/T2 < 2.0$.

4. The inertial measurement unit according to claim 3, wherein
   $0.9 < T3/T2 < 1.1$.

5. The inertial measurement unit according to claim 1, wherein
   $T1 \leq 10$ μm.

6. The inertial measurement unit according to claim 1 wherein
   the first beam is connected to the outer beam via a connecting part.

7. The inertial measurement unit according to claim 6 wherein
   the connecting part is connected to an intermediate portion of the first beam.

8. The inertial measurement unit according to claim 7, wherein
   the first beam and the connecting part are integrally T-shaped in a plan view along the Z-axis.

9. The inertial measurement unit according to claim 1, wherein
   the structure includes a drive part and a detection part.

10. The inertial measurement unit according to claim 9, wherein
    the first beam faces the drive part.

11. The inertial measurement unit according to claim 9, wherein
    the detection part is configured to detect angular velocity based on a change in capacitance.

12. An inertial measurement unit comprising:
    an angular velocity sensor;
    an acceleration sensor;
    a micro controller configured to control the angular velocity sensor and the acceleration sensor; and
    a main board on which the angular velocity sensor, the acceleration sensor, and the micro controller unit are mounted,
    wherein the angular velocity sensor comprises:
       three mutually orthogonal axes being defined as an X-axis, a Y-axis, and a Z-axis;
       a substrate; and
       a sensor element supported on an upper surface of the substrate, the upper surface being located on a positive side of the Z axis, the sensor element being configured to detect a change in capacitance,
    wherein the sensor element comprises:
       a first structure arranged on the upper surface of the substrate that is fixed;
       a second structure arranged on the upper surface of the substrate that is fixed;
       a third structure arranged on the upper surface of the substrate that is movable relative to the first structure and the second structure;
       an elastic part arranged on the upper surface of the substrate that connects the second structure to the third structure,
       wherein the elastic part includes an inner beam and an outer beam arranged in parallel with each other,
       the outer beam is arranged between the inner beam and the first structure,
          the elastic part includes a first beam parallel to the outer beam, the first beam includes a pair of ends, and each end is a free end,
       in a plan view along the Z-axis, the first beam is arranged between the outer beam and the first structure, and T2<T1, wherein a distance between the outer beam and the first structure is T1, and a distance between the inner beam and the outer beam is T2.

\* \* \* \* \*